US012705522B2

(12) United States Patent
Swallows et al.

(10) Patent No.: US 12,705,522 B2
(45) Date of Patent: Aug. 11, 2026

(54) COHERENT DE-EXCITATION OF ATOMIC OBJECT CRYSTAL MOTIONAL MODES TO FACILITATE TRANSPORT IN A TRAPPED-ION QUANTUM COMPUTER

(71) Applicant: Quantinuum LLC, Broomfield, CO (US)

(72) Inventors: Matthew Swallows, Lafayette, CO (US); Ivaylo Madjarov, Broomfield, CO (US); Maya I Fabrikant, Louisville, CO (US); Steven A. Moses, Broomfield, CO (US); Adam P. Reed, Broomfield, CO (US)

(73) Assignee: Quantinuum LLC, Broomfield, CO (US)

( * ) Notice: Subject to any disclaimer, the term of this patent is extended or adjusted under 35 U.S.C. 154(b) by 816 days.

(21) Appl. No.: 18/151,617

(22) Filed: Jan. 9, 2023

(65) Prior Publication Data

US 2023/0229956 A1 Jul. 20, 2023

Related U.S. Application Data

(60) Provisional application No. 63/266,923, filed on Jan. 19, 2022.

(51) Int. Cl.
*G06F 30/30* (2020.01)
*G06N 10/40* (2022.01)

(52) U.S. Cl.
CPC .................................... *G06N 10/40* (2022.01)

(58) Field of Classification Search
CPC ........... G06N 10/40; G06N 10/00; G21K 1/00
See application file for complete search history.

(56) References Cited

U.S. PATENT DOCUMENTS 10,951,002 B1 3/2021 Bohn et al.
11,025,228 B1 * 6/2021 Ascarrunz .............. G06N 10/40
(Continued)

FOREIGN PATENT DOCUMENTS

JP 2021-090054 A 6/2021

OTHER PUBLICATIONS

Outgoing—ISA/210—Declaration of Non-Establishment of International Search Report Mailed on Feb. 5, 2024 for WO Application No. PCT/US23/011036, 2 page(s).
(Continued)

*Primary Examiner* — Jack Chiang
*Assistant Examiner* — Brandon Bowers
(74) *Attorney, Agent, or Firm* — Alston & Bird LLP

(57) ABSTRACT

Quantum computers, systems, apparatuses, and/or the like and corresponding methods for de-exciting coherent motional modes of an atomic object crystal confined by an atomic object confinement apparatus. One or more voltage sources are controlled to cause a waveform to be applied to an array of electrodes of the atomic object confinement apparatus. Application of the waveform to the array of electrodes causes each of the one or more transport operations to be performed on the respective atomic object crystal and causes de-excitation of at least one coherent motional mode of the respective atomic object crystal corresponding to the at least one of the one or more transport operations. The respective shim waveform configured to de-excite the at least one coherent motional mode may be determined based on a parameterized shim waveform and a calibration process for determining parameters corresponding to the atomic object confinement apparatus.

20 Claims, 8 Drawing Sheets

(56) References Cited

U.S. PATENT DOCUMENTS

Figure 1:
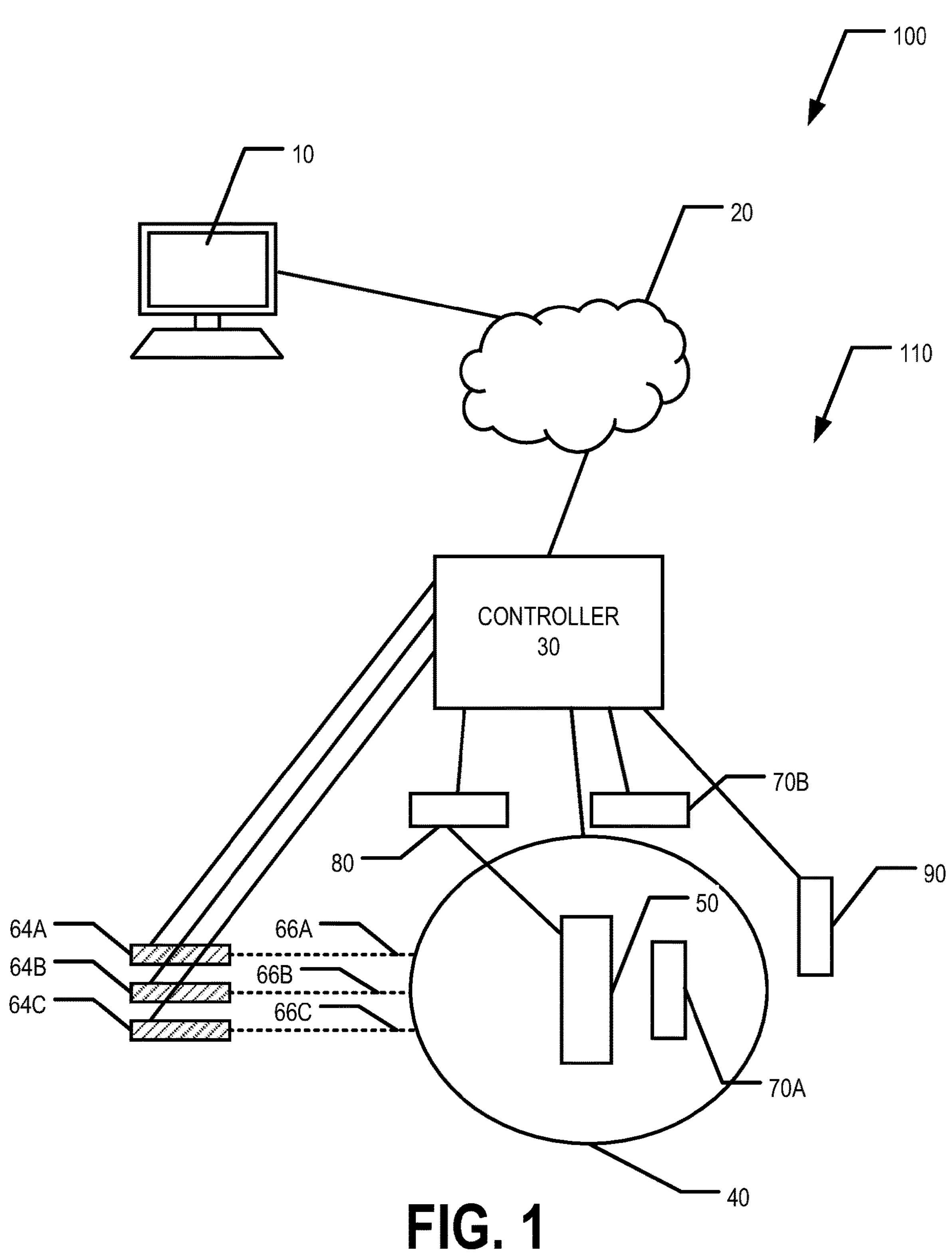

| | | | | |
|---|---|---|---|---|
| 11,037,776 | B1 | 6/2021 | Makotyn et al. | |
| 11,049,713 | B1 * | 6/2021 | Kokish | G06F 17/13 |
| 2021/0389522 | A1 * | 12/2021 | Rowe | G02F 1/2955 |
| 2022/0199391 | A1 | 6/2022 | Hayes et al. | |
| 2025/0385021 | A1 * | 12/2025 | Ollanik | G21K 1/00 |

OTHER PUBLICATIONS

Outgoing Written Opinion of the ISA Mailed on Feb. 5, 2024 for WO Application No. PCT/US23/011036, 4 page(s).
Ballance, C.J., "High-fidelity quantum logic gates using trapped-ion hyperfine qubits", dated Jun. 21, 2016 retrieved from Cornell University Online Library Archive on the Internet at https://arxiv.org/pdf/1512.04600.pdf on Feb. 21, 2024, 11 pages.
Bowler, R., et al., "Coherent Diabatic lon Transport and Separation in a Multi-Zone Trap Array", dated Jun. 4, 2012, retrieved from Cornell University Online Library Archive on the Internet at https://arxiv.org/pdf/1206.0780v1.pdf on Feb. 21, 2024, 5 pages.
Clark, Craig R., "Characterization of Fast Ion Transport via Position-Dependent Optical Deshelving", dated Apr. 28, 2023, retrieved from Cornell University Online Library Archive on the Internet at https://arxiv.org/pdf/2301.05279v2.pdf on Feb. 21, 2024, 6 pages.
Clark, Craig R., et al., "High-Fidelity Bell-State Preparation with 40Ca+ Optical Qubits", dated Oct. 18, 2021, retrieved from Cornell University Online Library Archive on the Internet at https://arxiv.org/pdf/2105.05828v3.pdf on Feb. 21, 2024, 7 pages.
Clark, Craig, "New additions to the trapped-ion quantum toolbox", Proceedings of the IEEE International Conference on Quantum Computing and Engineering (QCE21), Oct. 22, 2021, retrieved from the Internet at https://qce.quantum.ieee.org/2021/wp-content/uploads/2021/10/ionworkshop_abstracts.pdf on Feb. 22, 2024, 3 pages.
Clark, Craig, et al., "Characterization of Fast lon Transport via Position-Dependent Optical Deshelving", Abstract: X10.00008, 52nd Annual Meeting of the APS Division of Atomic, Molecular and Optical Physics, May (2021), retrieved from the Internet at https://meetings.aps.org/Meeting/DAMOP21/Session/X10.8 on Feb. 21, 2024, 1 page.
Gaebler, J.P., et al., "High-Fidelity Universal Gate Set for 9Be+ Ion Qubits", Physical Review Letters, Week ending Aug. 5, 2016, pp. 060505-1 thru 060505-5, vol. 117, American Physical Society, US.
Kielpinski, D., et al., "Architecture for a large-scale ion-trap quantum computer", Nature, Jun. 13, 2002, pp. 709-711, vol. 417, Nature Publishing Group, Germany.
Mccormick, Katherine C., et al., "Coherently displaced oscillator quantum states of a single trapped atom", dated Nov. 1, 2018 retrieved from Cornell University Online Library Archive on the Internet at https://arxiv.org/pdf/1811.00668v1.pdf on Feb. 21, 2024, 19 pages.
Pino, J.M., et al., "Demonstration of the trapped-ion quantum CCD computer architecture", dated Apr. 9, 2021, retrieved from Cornell University Online Library Archive on the Internet at https://arxiv.org/pdf/2003.01293v4.pdf on Feb. 21, 2024, 11 pages.
U.S. Provisional Patent Application for "Periodic Multi-Dimensional Atomic Object Confinement Apparatus Having Curved Legs", unpublished (Filed Aug. 19, 2021), Christopher Langer (Inventor), Quantinuum LLC (Assignee), U.S. Appl. No. 63/235,007.
Walther, A., et al., "Controlling Fast Transport of Cold Trapped lons", dated Jun. 5, 2012, retrieved from Cornell University Online Library Archive at https://arxiv.org/pdf/1206.0364v1.pdf on Feb. 21, 2024, 5 pages.
English translation of JP Decision to Grant dated Jul. 8, 2025 for JP Application No. 2024543005, 2 page(s).
JP Decision to Grant Mailed on Jul. 8, 2025 for JP Application No. 2024543005, 3 page(s).

* cited by examiner

COHERENT DE-EXCITATION OF ATOMIC OBJECT CRYSTAL MOTIONAL MODES TO FACILITATE TRANSPORT IN A TRAPPED-ION QUANTUM COMPUTER

CROSS-REFERENCE TO RELATED APPLICATIONS

This application claims priority to U.S. Application No. 63/266,923, filed Jan. 19, 2022, the content of which is incorporated herein by reference in it entirety.

TECHNICAL FIELD

Various embodiments relate to atomic objects confined by an atomic object confinement apparatus. For example, various embodiments relate to de-excitation of motional modes of an atomic object crystal confined by an atomic object confinement apparatus. For example, various embodiments relate to de-excitation of motional modes of atomic object crystals of a trapped-atomic-object quantum computer.

BACKGROUND

Quantum charge-coupled device (QCCD) is a quantum computing architecture in which atomic objects are confined within an atomic object confinement apparatus and at least some of the atomic objects are used to perform quantum calculations. The atomic objects may be transported between different locations of the atomic object confinement apparatus. However, these transportation operations cause the atomic objects to become heated. Cooling operations can be performed on the atomic objects to cool the atomic objects to a desired level. However, these cooling operations are slow compared to other operations performed by the quantum computer and therefore amount to a significant portion of the processing time of the quantum computer. Through applied effort, ingenuity, and innovation many deficiencies of such conventional cooling systems have been solved by developing solutions that are structured in accordance with the embodiments of the present invention, many examples of which are described in detail herein.

BRIEF SUMMARY OF EXAMPLE EMBODIMENTS

Example embodiments provide quantum computers, systems, apparatuses, and/or the like and corresponding methods for de-exciting coherent motional modes of an atomic object crystal confined by an atomic object confinement apparatus. In various scenarios, the coherent motional modes of the atomic object crystal become excited during a transportation operation. In various embodiments, the coherent motional modes are then de-excited by applying one or more shim waveforms to generate an electric potential gradient at the location of the atomic object crystal. The electric potential gradient imparts a force on the atomic object crystal that counters the motion of the excited coherent motional modes so as reduce motion in accordance with the coherent motional modes. In various embodiments, the electric potential gradient evolves with and/or oscillates as a function of time with a frequency substantially equal to a respective motional mode such that the instantaneous force imparted on the atomic object crystal experiencing the electric potential gradient is substantially anti-parallel to and/or substantially equal and/or similar to in amplitude to the acceleration of the atomic objects due to the respective motional mode. As such, the motional energy of the atomic object crystal is reduced.

According to one aspect, a method for calibrating parameters of a shim waveform for a particular atomic object confinement apparatus for use in a de-excitation operation is provided. In an example embodiment, the method comprises causing the particular atomic object confinement apparatus to perform a transport operation on at least one atomic object crystal confined by the atomic object confinement apparatus; capturing a first crystal spectra for the atomic object crystal; identifying one or more sidebands in the first crystal spectra; determining a respective motional frequency and a respective motional amplitude for each of the one or more sidebands based on the first crystal spectra; defining a phase-parameterized shim waveform based on the respective motional frequency and the respective motional amplitude, wherein the phase-parameterized shim waveform is a function of phase; and causing the phase-parameterized shim waveform to be applied to the atomic object crystal while a phase parameter of the phase-parameterized shim waveform is incremented over a phase range and capturing one or more second crystal spectra. The method further comprises, based on the one or more second crystal spectra, determining a phase within the phase range that minimizes at least a respective sideband of the one or more sidebands; defining a particular-mode shim waveform based on the phase-parameterized shim waveform and the phase; and providing or storing the shim waveform for use when performing a quantum operation using the particular atomic object confinement apparatus.

In an example embodiment, the method is performed by a controller of a quantum computer.

In an example embodiment, the method further comprises determining a plurality of phase-parameterized shim waveforms, with each of the plurality of phase-parameterized shim waveforms corresponding to respective sidebands of the one or more sidebands and respective phases are determined based at least in part on application of each of the plurality of phase-parameterized shim waveforms to the atomic object crystal and the one or more second crystal spectra.

In an example embodiment, the method further comprise determining a multi-mode shim waveform based on the plurality of phase-parameterized shim waveforms and the respective phases.

In an example embodiment, particular-mode shim waveform comprises a series of voltages to be applied to an array of electrodes of the particular atomic object confinement apparatus to cause the motional energy in a respective particular mode of the atomic object crystal to be reduced.

In an example embodiment, the particular-mode shim waveform is configured to, when the particular-mode shim waveform is applied to the array of electrodes, cause a gradient in the electric potential at a first location of the particular atomic object confinement apparatus and to not cause a gradient in the electric field at one or more second locations of the particular atomic object confinement apparatus, wherein the atomic object crystal is located at the first location and is not located at any of the one or more second locations.

In an example embodiment, the particular-mode shim waveform is associated with or parameterized by an axial frequency corresponding to at least one of (a) the transport operation or (b) an electric potential well at a first location of the particular atomic object confinement apparatus, wherein the atomic object crystal is located at the first location.

In an example embodiment, capturing respective spectra of the first and second crystal spectra comprises probing the atomic object crystal with a laser beam for a fixed exposure time, the laser beam characterized by a probe frequency that corresponds to a Raman transition of at least one component of the atomic object crystal and detecting light emitted by the atomic object crystal in response to the laser beam being incident thereon.

In an example embodiment, the respective spectra of the first and second crystal spectra comprise a primary line at the probe frequency and the one or more sidebands are each spaced apart from the primary line by a respective frequency corresponding to the respective motional frequency.

According to another aspect, an apparatus configured to cause and/or control de-excitation of motional modes of an atomic object confined by an atomic object confinement apparatus is provided. In an example embodiment, the apparatus comprises at least one processor and memory storing computer-executable instructions. The computer-executable instructions are configured to, when executed by the at least one processor, cause the apparatus to at least cause the particular atomic object confinement apparatus to perform a transport operation on at least one atomic object crystal confined by the atomic object confinement apparatus; capture a first crystal spectra for the atomic object crystal; identify one or more sidebands in the first crystal spectra; determining a respective motional frequency and a respective motional amplitude for each of the one or more sidebands based on the first crystal spectra; define a phase-parameterized shim waveform based on the respective motional frequency and the respective motional amplitude, wherein the phase-parameterized shim waveform is a function of phase; and cause the phase-parameterized shim waveform to be applied to the atomic object crystal while a phase parameter of the phase-parameterized shim waveform is incremented over a phase range and capturing one or more second crystal spectra. The computer-executable instructions are further configured to, when executed by the at least one processor, cause the apparatus to at least, based on the one or more second crystal spectra, determine a phase within the phase range that minimizes at least a respective sideband of the one or more sidebands; define a particular-mode shim waveform based on the phase-parameterized shim waveform and the phase; and provide or store the shim waveform for use when performing a quantum operation using the particular atomic object confinement apparatus.

In an example embodiment, the apparatus is a controller of a quantum computer.

In an example embodiment, the computer-executable instructions are further configured to, when executed by the at least one processor, cause the apparatus to at least determine a plurality of phase-parameterized shim waveforms, with each of the plurality of phase-parameterized shim waveforms corresponding to respective sidebands of the one or more sidebands and respective phases are determined based at least in part on application of each of the plurality of phase-parameterized shim waveforms to the atomic object crystal and the one or more second crystal spectra.

In an example embodiment, the computer-executable instructions are further configured to, when executed by the at least one processor, cause the apparatus to at least determine a multi-mode shim waveform based on the plurality of phase-parameterized shim waveforms and the respective phases.

In an example embodiment, particular-mode shim waveform comprises a series of voltages to be applied to an array of electrodes of the particular atomic object confinement apparatus to cause the motional energy in a respective particular mode of the atomic object crystal to be reduced.

In an example embodiment, the particular-mode shim waveform is configured to, when the particular-mode shim waveform is applied to the array of electrodes, cause a gradient in the electric potential at a first location of the particular atomic object confinement apparatus and to not cause a gradient in the electric field at one or more second locations of the particular atomic object confinement apparatus, wherein the atomic object crystal is located at the first location and is not located at any of the one or more second locations.

In an example embodiment, the particular-mode shim waveform is associated with or parameterized by an axial frequency corresponding to at least one of (a) the transport operation or (b) an electric potential well at a first location of the particular atomic object confinement apparatus, wherein the atomic object crystal is located at the first location.

In an example embodiment, capturing respective spectra of the first and second crystal spectra comprises probing the atomic object crystal with a laser beam for a fixed exposure time, the laser beam characterized by a probe frequency that corresponds to a Raman transition of at least one component of the atomic object crystal and detecting light emitted by the atomic object crystal in response to the laser beam being incident thereon.

In an example embodiment, the respective spectra of the first and second crystal spectra comprise a primary line at the probe frequency and the one or more sidebands are each spaced apart from the primary line by a respective frequency corresponding to the respective motional frequency.

According to yet another aspect, a system is provided. In an example embodiment, the system comprises an atomic object confinement apparatus configured to confine one or more atomic object crystals therein and a controller. The controller comprises at least one processor and memory storing computer-executable instructions, the computer-executable instructions are configured to, when executed by the at least one processor, cause the controller to at least cause the particular atomic object confinement apparatus to perform a transport operation on at least one atomic object crystal confined by the atomic object confinement apparatus; capture a first crystal spectra for the atomic object crystal; identify one or more sidebands in the first crystal spectra; determining a respective motional frequency and a respective motional amplitude for each of the one or more sidebands based on the first crystal spectra; define a phase-parameterized shim waveform based on the respective motional frequency and the respective motional amplitude, wherein the phase-parameterized shim waveform is a function of phase; and cause the phase-parameterized shim waveform to be applied to the atomic object crystal while a phase parameter of the phase-parameterized shim waveform is incremented over a phase range and capturing one or more second crystal spectra. The computer-executable instructions are further configured to, when executed by the at least one processor, cause the apparatus to at least, based on the one or more second crystal spectra, determine a phase within the phase range that minimizes at least a respective sideband of the one or more sidebands; define a particular-mode shim waveform based on the phase-parameterized shim waveform and the phase; and provide or store the shim waveform for use when performing a quantum operation using the particular atomic object confinement apparatus.

In an example embodiment, the system is a QCCD quantum computer.

In an example embodiment, the computer-executable instructions are further configured to, when executed by the at least one processor, cause the apparatus to at least determine a plurality of phase-parameterized shim waveforms, with each of the plurality of phase-parameterized shim waveforms corresponding to respective sidebands of the one or more sidebands and respective phases are determined based at least in part on application of each of the plurality of phase-parameterized shim waveforms to the atomic object crystal and the one or more second crystal spectra.

In an example embodiment, the computer-executable instructions are further configured to, when executed by the at least one processor, cause the apparatus to at least determine a multi-mode shim waveform based on the plurality of phase-parameterized shim waveforms and the respective phases.

In an example embodiment, particular-mode shim waveform comprises a series of voltages to be applied to an array of electrodes of the particular atomic object confinement apparatus to cause the motional energy in a respective particular mode of the atomic object crystal to be reduced.

In an example embodiment, the particular-mode shim waveform is configured to, when the particular-mode shim waveform is applied to the array of electrodes, cause a gradient in the electric potential at a first location of the particular atomic object confinement apparatus and to not cause a gradient in the electric field at one or more second locations of the particular atomic object confinement apparatus, wherein the atomic object crystal is located at the first location and is not located at any of the one or more second locations.

In an example embodiment, the particular-mode shim waveform is associated with or parameterized by an axial frequency corresponding to at least one of (a) the transport operation or (b) an electric potential well at a first location of the particular atomic object confinement apparatus, wherein the atomic object crystal is located at the first location.

In an example embodiment, capturing respective spectra of the first and second crystal spectra comprises probing the atomic object crystal with a laser beam for a fixed exposure time, the laser beam characterized by a probe frequency that corresponds to a Raman transition of at least one component of the atomic object crystal and detecting light emitted by the atomic object crystal in response to the laser beam being incident thereon.

In an example embodiment, the respective spectra of the first and second crystal spectra comprise a primary line at the probe frequency and the one or more sidebands are each spaced apart from the primary line by a respective frequency corresponding to the respective motional frequency.

According to another aspect, a method for using coherent mode de-excitation during a transport operation of an atomic object crystal confined by an atomic object confinement apparatus. In an example embodiment, the method comprises identifying one or more transport operations to be performed at least partially in parallel. Each transport operation of the one or more transport operations corresponds to moving a respective atomic object crystal from a respective start location to a respective destination location, the start location and destination location being locations within the atomic object confinement apparatus. The method further comprises determining respective shim waveforms for at least one of the one or more transport operations; determining respective transport waveforms for each transport operation; determining an applied waveform based on an aggregation of the respective shim waveforms and the respective transport waveforms; and controlling one or more voltage sources to cause waveform voltage signals in accordance with the applied waveform to be applied to electrodes of an array of electrodes of the atomic object confinement apparatus. Application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

In an example embodiment, the method is performed by a controller of a quantum computer.

In an example embodiment, the respective shim waveforms are an aggregation of two or more particular-mode shim waveforms, each of the two or more particular-mode shim waveforms corresponding to a different coherent motional mode of the respective atomic object crystal.

In an example embodiment, the respective shim waveforms are an aggregation of at least (a) a first particular-mode shim waveform corresponding to a first coherent motional mode of the respective atomic object crystal and (b) a second particular-mode shim waveform corresponding to a second coherent motional mode of the respective atomic object crystal, the first coherent motional mode is characterized by a first motional frequency and the second coherent motional mode is characterized by a second motional frequency, the first motional frequency and the second motional frequency are different.

In an example embodiment, the first coherent motional mode is a center-of-mass mode and the second coherent motional mode is a stretch mode.

In an example embodiment, the applied waveform comprises a series of voltages to be applied to an array of electrodes of the atomic object confinement apparatus to cause the one or more transport operations to be performed and to cause a gradient in the electric potential at a first location of the atomic object confinement apparatus where the respective atomic object crystal corresponding to the at least one transport operation is located in the particular atomic object confinement apparatus.

In an example embodiment, the first location follows the atomic object crystal from the respective start location to the respective destination location of the at least one of the one or more transport operations.

In an example embodiment, the at least one of the one or more transport operations comprises at least a first transport operation and a second transport operation, the first transport operation comprises moving a first electric potential well within which a first atomic object crystal is located from a first start location to a first destination location and the second transport operation comprises moving a second potential well within which a second atomic object crystal is located from a second start location to a second destination location, and the applied waveform comprises (a) at least one particular-mode shim waveform configured to cause a first gradient in the electric potential co-located with the first potential well as the first potential well moves from the first start location to the first destination location and (b) at least one particular-mode shim waveform configured to cause a second gradient in the electric potential co-located with the second potential well as the second potential well moves from the second start location to the second destination.

In an example embodiment, the first gradient is substantially zero at the location of the second atomic object crystal and the second gradient is substantially zero at the location of the first atomic object crystal.

In an example embodiment, the first potential well defines a first axial frequency, the second potential well defines a second axial frequency, and the first axial frequency and the second axial frequency are spaced apart by 0.05 to 5 MHz.

In an example embodiment, the respective particular-mode shim waveforms are each associated with or parameterized by a respective axial frequency corresponding to at least one of (a) the transport operation or (b) an electric potential well at a location of the particular atomic object confinement apparatus where the respective atomic object crystal is located.

In an example embodiment, the respective particular mode shim waveforms are each parameterized by a respective motional mode frequency, a respective motional mode amplitude, and a respective phase.

According to another aspect, an apparatus configured to cause and/or control de-excitation of motional modes of an atomic object confined by an atomic object confinement apparatus is provided. In an example embodiment, the apparatus comprises at least one processor and memory storing computer-executable instructions. The computer-executable instructions are configured to, when executed by the at least one processor, cause the apparatus to at least identify one or more transport operations to be performed at least partially in parallel. Each transport operation of the one or more transport operations corresponds to moving a respective atomic object crystal from a respective start location to a respective destination location, the start location and destination location being locations within the atomic object confinement apparatus. The computer-executable instructions are further configured to, when executed by the at least one processor, cause the apparatus to at least determine respective shim waveforms for at least one of the one or more transport operations; determine respective transport waveforms for each transport operation; determine an applied waveform based on an aggregation of the respective shim waveforms and the respective transport waveforms; and control one or more voltage sources to cause waveform voltage signals in accordance with the applied waveform to be applied to electrodes of an array of electrodes of the atomic object confinement apparatus. Application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

In an example embodiment, the apparatus is a controller of a quantum computer.

In an example embodiment, the respective shim waveforms are an aggregation of two or more particular-mode shim waveforms, each of the two or more particular-mode shim waveforms corresponding to a different coherent motional mode of the respective atomic object crystal.

In an example embodiment, the respective shim waveforms are an aggregation of at least (a) a first particular-mode shim waveform corresponding to a first coherent motional mode of the respective atomic object crystal and (b) a second particular-mode shim waveform corresponding to a second coherent motional mode of the respective atomic object crystal, the first coherent motional mode is characterized by a first motional frequency and the second coherent motional mode is characterized by a second motional frequency, the first motional frequency and the second motional frequency are different.

In an example embodiment, the first coherent motional mode is a center-of-mass mode and the second coherent motional mode is a stretch mode.

In an example embodiment, the applied waveform comprises a series of voltages to be applied to an array of electrodes of the atomic object confinement apparatus to cause the one or more transport operations to be performed and to cause a gradient in the electric potential at a first location of the atomic object confinement apparatus where the respective atomic object crystal corresponding to the at least one transport operation is located in the particular atomic object confinement apparatus.

In an example embodiment, the first location follows the atomic object crystal from the respective start location to the respective destination location of the at least one of the one or more transport operations.

In an example embodiment, the at least one of the one or more transport operations comprises at least a first transport operation and a second transport operation, the first transport operation comprises moving a first electric potential well within which a first atomic object crystal is located from a first start location to a first destination location and the second transport operation comprises moving a second potential well within which a second atomic object crystal is located from a second start location to a second destination location, and the applied waveform comprises (a) at least one particular-mode shim waveform configured to cause a first gradient in the electric potential co-located with the first potential well as the first potential well moves from the first start location to the first destination location and (b) at least one particular-mode shim waveform configured to cause a second gradient in the electric potential co-located with the second potential well as the second potential well moves from the second start location to the second destination.

In an example embodiment, the first gradient is substantially zero at the location of the second atomic object crystal and the second gradient is substantially zero at the location of the first atomic object crystal.

In an example embodiment, the first potential well defines a first axial frequency, the second potential well defines a second axial frequency, and the first axial frequency and the second axial frequency are spaced apart by 0.05 to 5 MHz.

In an example embodiment, the respective particular-mode shim waveforms are each associated with or parameterized by a respective axial frequency corresponding to at least one of (a) the transport operation or (b) an electric potential well at a location of the particular atomic object confinement apparatus where the respective atomic object crystal is located.

In an example embodiment, the respective particular mode shim waveforms are each parameterized by a respective motional mode frequency, a respective motional mode amplitude, and a respective phase.

According to yet another aspect, a system is provided. In an example embodiment, the system comprises an atomic object confinement apparatus configured to confine one or more atomic object crystals therein and a controller. The controller comprises at least one processor and memory storing computer-executable instructions, the computer-executable instructions are configured to, when executed by the at least one processor, cause the controller to at least identify one or more transport operations to be performed at least partially in parallel. Each transport operation of the one or more transport operations corresponds to moving a respective atomic object crystal from a respective start location to a respective destination location, the start location and destination location being locations within the atomic object confinement apparatus. The computer-executable instructions are further configured to, when executed by the at least one processor, cause the apparatus to at least determine respective shim waveforms for at least one of the one or more transport operations; determine respective transport waveforms for each transport operation; determine an applied waveform based on an aggregation of the respective shim waveforms and the respective transport waveforms; and control one or more voltage sources to cause waveform voltage signals in accordance with the applied waveform to be applied to electrodes of an array of electrodes of the atomic object confinement apparatus. Application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

In an example embodiment, the system is a QCCD quantum computer.

In an example embodiment, the respective shim waveforms are an aggregation of two or more particular-mode shim waveforms, each of the two or more particular-mode shim waveforms corresponding to a different coherent motional mode of the respective atomic object crystal.

In an example embodiment, the respective shim waveforms are an aggregation of at least (a) a first particular-mode shim waveform corresponding to a first coherent motional mode of the respective atomic object crystal and (b) a second particular-mode shim waveform corresponding to a second coherent motional mode of the respective atomic object crystal, the first coherent motional mode is characterized by a first motional frequency and the second coherent motional mode is characterized by a second motional frequency, the first motional frequency and the second motional frequency are different.

In an example embodiment, the first coherent motional mode is a center-of-mass mode and the second coherent motional mode is a stretch mode.

In an example embodiment, the applied waveform comprises a series of voltages to be applied to an array of electrodes of the atomic object confinement apparatus to cause the one or more transport operations to be performed and to cause a gradient in the electric potential at a first location of the atomic object confinement apparatus where the respective atomic object crystal corresponding to the at least one transport operation is located in the particular atomic object confinement apparatus.

In an example embodiment, the first location follows the atomic object crystal from the respective start location to the respective destination location of the at least one of the one or more transport operations.

In an example embodiment, the at least one of the one or more transport operations comprises at least a first transport operation and a second transport operation, the first transport operation comprises moving a first electric potential well within which a first atomic object crystal is located from a first start location to a first destination location and the second transport operation comprises moving a second potential well within which a second atomic object crystal is located from a second start location to a second destination location, and the applied waveform comprises (a) at least one particular-mode shim waveform configured to cause a first gradient in the electric potential co-located with the first potential well as the first potential well moves from the first start location to the first destination location and (b) at least one particular-mode shim waveform configured to cause a second gradient in the electric potential co-located with the second potential well as the second potential well moves from the second start location to the second destination.

In an example embodiment, the first gradient is substantially zero at the location of the second atomic object crystal and the second gradient is substantially zero at the location of the first atomic object crystal.

In an example embodiment, the first potential well defines a first axial frequency, the second potential well defines a second axial frequency, and the first axial frequency and the second axial frequency are spaced apart by 0.05 to 5 MHz.

In an example embodiment, the respective particular-mode shim waveforms are each associated with or parameterized by a respective axial frequency corresponding to at least one of (a) the transport operation or (b) an electric potential well at a location of the particular atomic object confinement apparatus where the respective atomic object crystal is located.

In an example embodiment, the respective particular mode shim waveforms are each parameterized by a respective motional mode frequency, a respective motional mode amplitude, and a respective phase.

According to another aspect, a method for reducing parasitic cross-talk between de-excitation operations performed at least partially in parallel at different locations within an atomic object confinement apparatus is provided. In an example embodiment, the method comprises determining a first de-excitation operation to be performed at a first location within the atomic object confinement apparatus and a second de-excitation operation to be performed at a second location within the atomic object confinement apparatus; assigning a first axial frequency to a first potential well located at the first location and a second axial frequency to a second potential well located at the second location, wherein the first axial frequency and the second axial frequency are spaced apart from one another by 0.05 to 5 MHz; determining a first shim waveform corresponding to the first axial frequency and a second shim waveform corresponding to the second axial frequency; and controlling one or more voltage sources to cause respective waveform voltage signals to be applied to electrodes of an electrode array of the atomic object confinement apparatus to cause the first potential well to be characterized by the first axial frequency, the second potential well to be characterized by the second axial frequency, the first de-excitation operation to be performed at the first location based on the first shim waveform, and the second de-excitation operation to be performed at the second location based on the second shim waveform.

In an example embodiment, the method is performed by a controller of a quantum computer.

According to another aspect, an apparatus configured to cause and/or control de-excitation of motional modes of an atomic object confined by an atomic object confinement apparatus is provided. In an example embodiment, the apparatus comprises at least one processor and memory storing computer-executable instructions. The computer-executable instructions are configured to, when executed by the at least one processor, cause the apparatus to at least determine a first de-excitation operation to be performed at a first location within the atomic object confinement apparatus and a second de-excitation operation to be performed at a second location within the atomic object confinement apparatus; assign a first axial frequency to a first potential well located at the first location and a second axial frequency to a second potential well located at the second location, wherein the first axial frequency and the second axial frequency are spaced apart from one another by 0.05 to 5 MHz; determine a first shim waveform corresponding to the first axial frequency and a second shim waveform corresponding to the second axial frequency; and control one or more voltage sources to cause respective waveform voltage signals to be applied to electrodes of an electrode array of the atomic object confinement apparatus to cause the first potential well to be characterized by the first axial frequency, the second potential well to be characterized by the second axial frequency, the first de-excitation operation to be performed at the first location based on the first shim waveform, and the second de-excitation operation to be performed at the second location based on the second shim waveform.

In an example embodiment, the apparatus is a controller of a quantum computer.

According to yet another aspect, a system is provided. In an example embodiment, the system comprises an atomic object confinement apparatus configured to confine one or more atomic object crystals therein and a controller. The controller comprises at least one processor and memory storing computer-executable instructions, the computer-executable instructions are configured to, when executed by the at least one processor, cause the controller to at least determine a first de-excitation operation to be performed at a first location within the atomic object confinement apparatus and a second de-excitation operation to be performed at a second location within the atomic object confinement apparatus; assign a first axial frequency to a first potential well located at the first location and a second axial frequency to a second potential well located at the second location, wherein the first axial frequency and the second axial frequency are spaced apart from one another by 0.05 to 5 MHz; determine a first shim waveform corresponding to the first axial frequency and a second shim waveform corresponding to the second axial frequency; and control one or more voltage sources to cause respective waveform voltage signals to be applied to electrodes of an electrode array of the atomic object confinement apparatus to cause the first potential well to be characterized by the first axial frequency, the second potential well to be characterized by the second axial frequency, the first de-excitation operation to be performed at the first location based on the first shim waveform, and the second de-excitation operation to be performed at the second location based on the second shim waveform.

In an example embodiment, the system is a QCCD quantum computer.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example atomic object quantum computer, in accordance with an example embodiment.

Figure 2:
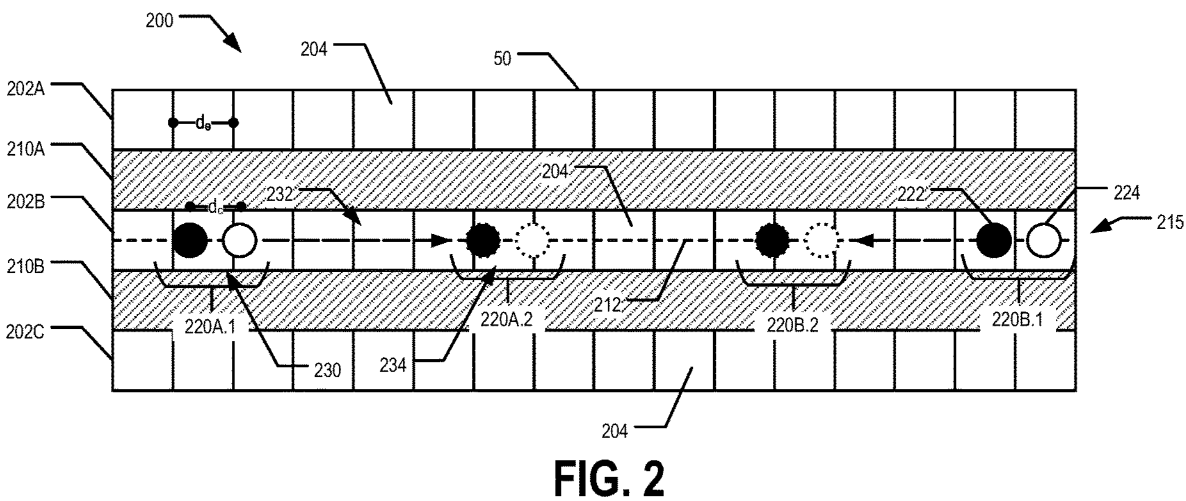

FIG. 2 provides a block diagram illustrating two atomic object crystals in a portion of an atomic object confinement apparatus, in accordance with an example embodiment.

Figure 3:
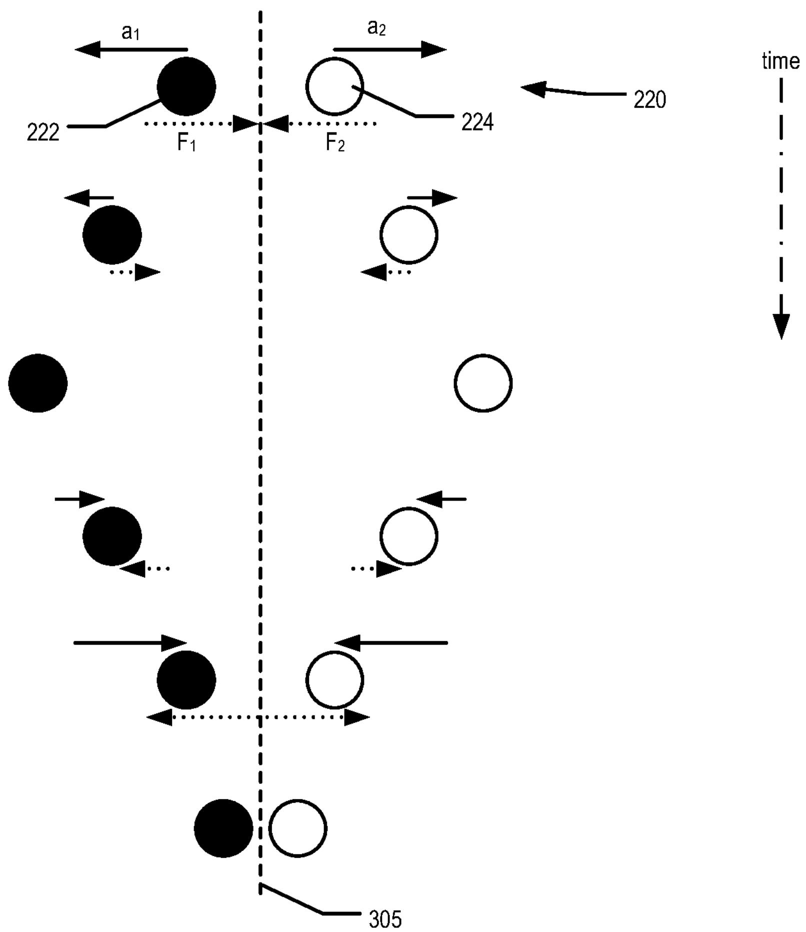

FIG. 3 provides a schematic diagram illustrating an atomic object crystal oscillating in a center-of-mass coherent motional mode and the force imparted to the atomic object crystal as a result of the application of the corresponding particular-mode shim waveform, in accordance with an example embodiment.

Figure 4:
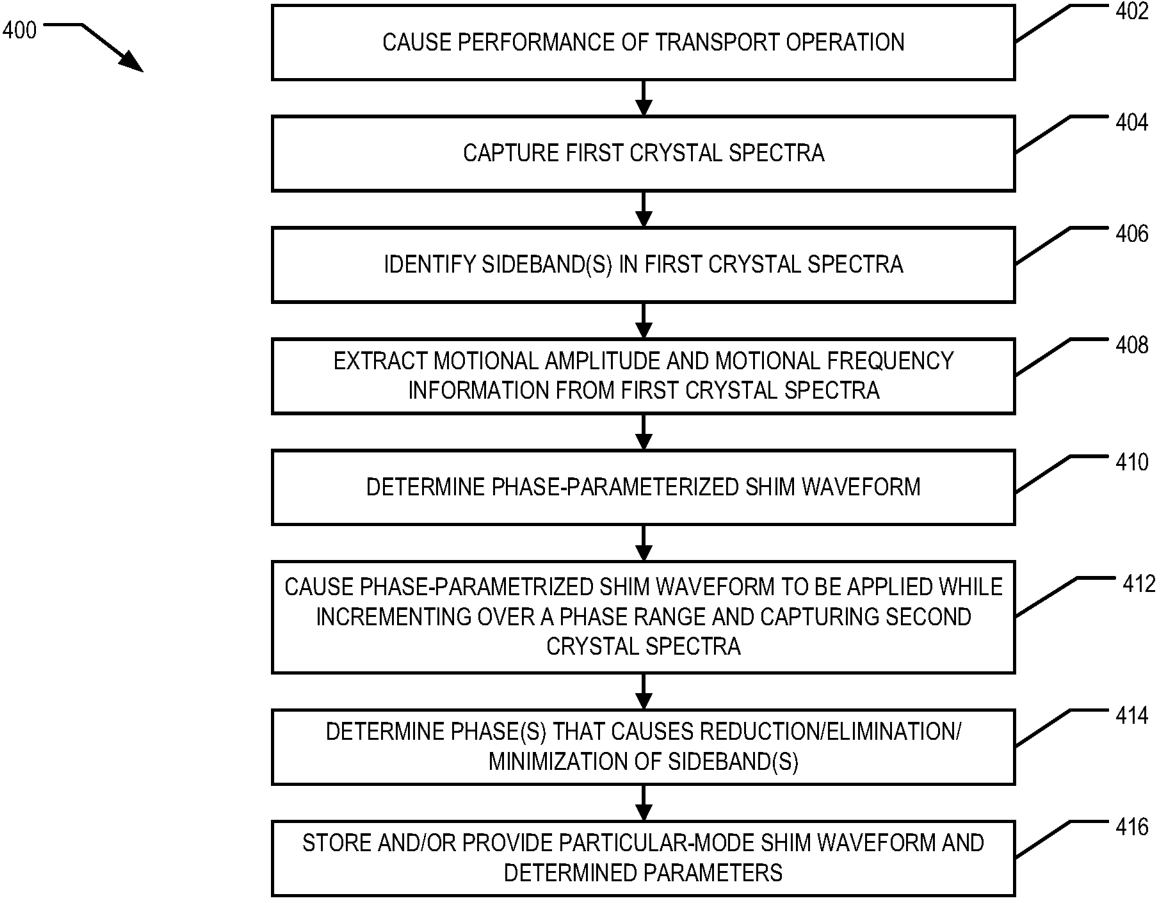

FIG. 4 provides a flowchart illustrating various processes, procedures, and/or operations of performing a shim waveform calibration, in accordance with an example embodiment.

Figure 5:
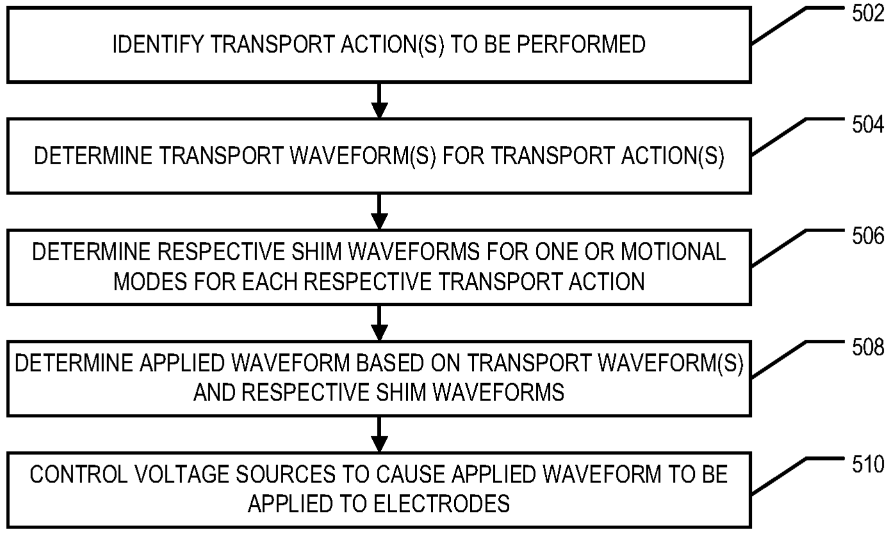

FIG. 5 provides a flowchart illustrating various processes, procedures, and/or operations of applying a shim waveform performance of a quantum calculation, in accordance with an example embodiment.

Figure 6:
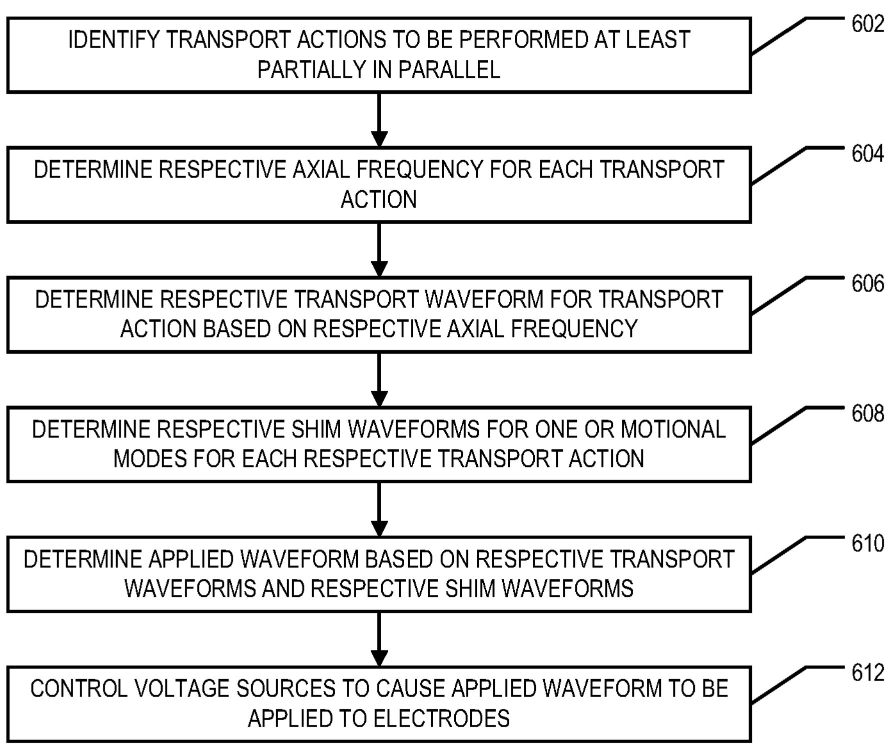

FIG. 6 provides a flowchart illustrating various processes, procedures, and/or operations of reducing parasitic crosstalk between de-excitation signals applied simultaneously to multiple areas of an atomic object confinement apparatus, in accordance with an example embodiment.

Figure 7:
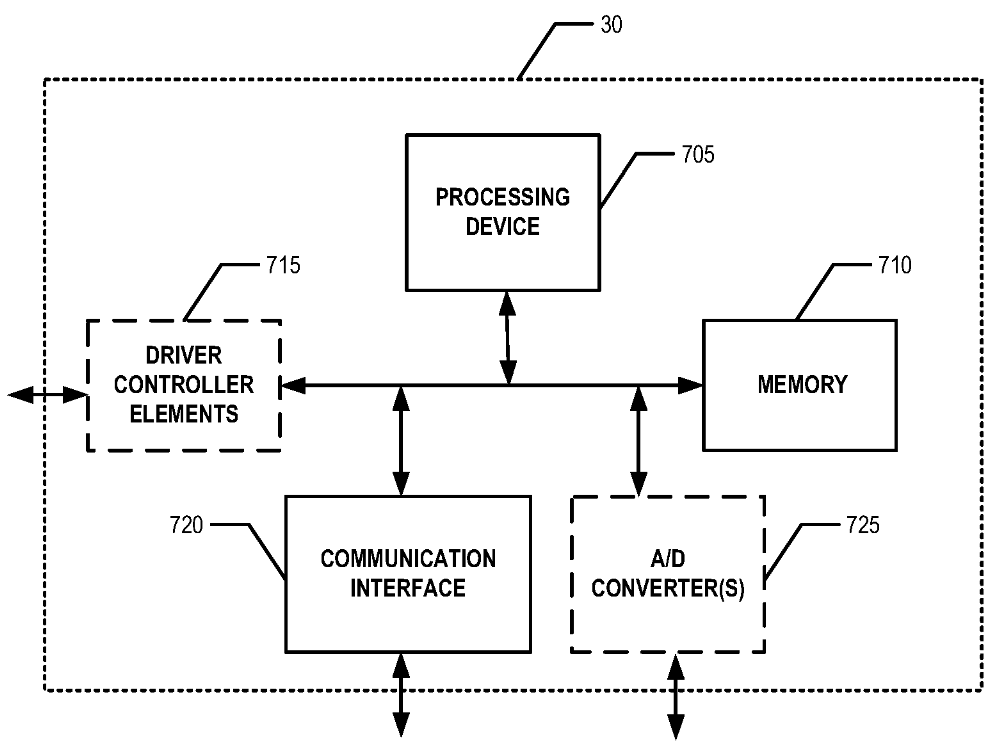

FIG. 7 provides a schematic diagram of an example controller of a quantum computer comprising an atomic object confinement apparatus configured for confining atomic objects therein, in accordance with an example embodiment.

Figure 8:
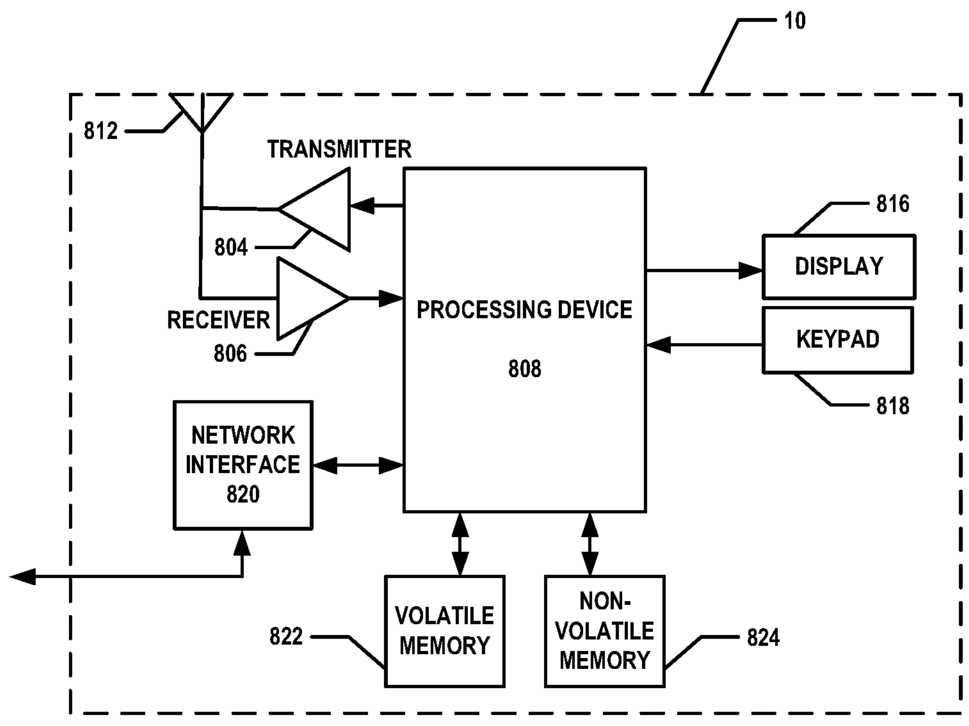

FIG. 8 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within applicable engineering and/or manufacturing tolerances and/or within user measurement capabilities, unless otherwise indicated. Like numbers refer to like elements throughout.

In various scenarios, atomic objects are confined within an atomic object confinement apparatus. In various embodiments, the atomic object confinement apparatus is an ion trap, such as a surface ion trap, Paul ion trap, and/or the like. In various embodiments, the atomic objects are ions, atoms, ionic or neutral molecules, and/or the like. In various embodiments, the atomic objects confined by the atomic object confinement apparatus are organized into atomic object crystals. For example, an atomic object crystal comprises two or more atomic objects. In an example embodiment, an atomic object crystal comprises four atomic objects. In an example embodiment, a first component of the atomic object crystal is a coolant ion for use in a sympathetic cooling scheme for the atomic object crystal. In an example embodiment, a second component of the atomic object crystal is a qubit ion for use as a qubit of a quantum computer. In various embodiments, the first component of the atomic object crystal and the second component of the atomic object crystal may be of the same atomic type or different atomic types, as appropriate for the application. As used herein, the atomic type of an atomic object and/or component of an atomic object crystal refers to the type of chemical element, atomic number, atomic/ionic species, and/or the like of the atomic object and/or component of the atomic object crystal. In an example embodiment, the atomic object crystal comprises two first components (e.g., two ions of a first atomic type) and two second components (e.g., two ions of a second atomic type).

In various embodiments, the atomic objects confined within the atomic object confinement apparatus are used to perform experiments, controlled quantum state evolution, quantum computations, and/or the like. In various embodiments, in order for the atomic objects confined within the atomic object confinement apparatus to be used to perform the experiments, controlled quantum state evolution, quantum computations, and/or the like, the atomic objects need to be at a low temperature and/or cooled near the motional ground state for the atomic object and/or the components thereof. For example, the motional states of the atomic objects and/or atomic object crystals need to be de-excited so that the atomic objects (e.g., the qubit ions) are in their motional ground state such that the atomic objects can be used to perform experiments, controlled quantum state evolution, quantum computations, and/or the like.

In various scenarios, during the performance of experiments, controlled quantum state evolution, quantum computations, and/or the like, the atomic objects and/or atomic object crystals may be transported from a respective start location within the atomic object confinement apparatus to a respective destination location within the atomic object confinement apparatus. During such transportation operations, the atomic objects and/or atomic object crystals become excited such that the atomic objects and/or atomic object crystals are no longer in their motional ground state. Conventionally, laser cooling is used to reduce the motional energy of the atomic object and/or components thereof. However, laser cooling is a slow process compared to various other processes executed during the performance of experiments, controlled quantum state evolution, quantum computations, and/or the like. For example, the time required to perform transportation and cooling operations is conventionally considered a limiting factor in the computational speed of QCCD quantum computers. Moreover, the significant amount of time required to cool atomic object crystals after performance of a transportation operation limits the depth of quantum circuits and/or quantum programs that can be performed by a QCCD quantum computer and can contribute to memory error. Thus, technical problems exist as to how to quickly and efficiently reduce the motional energy of an atomic object crystal and to de-excite the motional states of the atomic object crystal.

Atomic object crystals comprising two atomic objects (e.g., a coolant ion and a qubit ion) may oscillate in center-of-mass (COM) modes, where the two atomic objects oscillate in a manner that the distance between the two atomic objects remains substantially constant such that the center-of-mass of the atomic object crystal oscillates. The atomic object crystals comprising two atomic objects may also oscillate in stretch modes, where the distance between the two atomic objects expands and contracts in a periodic manner. Additionally, the atomic object crystals may oscillate in superpositions of COM modes and/or stretch modes that may have different motional frequencies, motional amplitudes, and/or phases. For example, the atomic object crystal may oscillate in a superposition of COM mode characterized by a COM frequency and a stretch mode characterized by a stretch frequency such that the motion of the atomic object crystal comprises a component characterized by the COM frequency and a component characterized by the stretch frequency. Additional motional modes and superpositions thereof are also possible, especially in instances where the charge-to-mass ratio of the components of the atomic object crystal are different. Thus, de-excitation of these superpositions of motional modes presents a technical challenge.

Additional technical challenges are presented when the atomic object crystal to be de-excited is one of a plurality of atomic object crystals confined by an atomic object confinement apparatus. In such scenarios it would be desired to de-excite a particular atomic object crystal while not simultaneously exciting any of the other atomic object crystals that are also confined by the atomic object confinement apparatus. It may also be desired to perform two or more de-excitation operations at least partially in parallel (e.g., semi-simultaneously and/or where the performance of the de-excitation operations at least partially overlap in time). Thus, a technical problem exists as to how to localize the effects of the de-excitation operation.

Various embodiments provide technical solutions to these and other technical problems relating to de-excitation of coherent motional modes of atomic object crystals confined by an atomic object confinement apparatus. For example, various embodiments provide mode-particular and/or multi-mode shim waveforms. The shim waveforms comprise a series of voltages. The series of voltages includes respective voltages to be applied to each electrode and/or a subset of electrodes of an electrode array of the atomic object confinement apparatus at a plurality of time steps. When the respective voltages of the series of voltages are applied to the electrode array of the atomic object confinement apparatus in time-ordered sequence specified by the series of voltages, an electric potential gradient that evolves with time is formed at the location of the atomic object crystal to be de-excited. The electric potential gradient is configured to impart a force on the atomic object crystal (and/or the components thereof) that counteracts the oscillatory motion(s) of the atomic object crystal (and/or components thereof).

In various embodiments, the mode-particular and/or multi-mode shim waveforms are configured to localize the resulting electric potential gradient at a particular location within the atomic object confinement apparatus. For example, the mode-particular and/or multi-mode shim waveforms may be configured such that the location of the resulting electric potential gradient is localized at the location of a target atomic object crystal while not affecting other nearby atomic object crystals and/or other atomic object crystals within the atomic object confinement apparatus. In various embodiments, the mode-particular and/or multi-mode shim waveforms may be configured such that the location of the resulting electric potential gradient may be non-constant such that a de-excitation operation may be performed on an atomic object crystal at least partially in parallel (e.g., semi-simultaneously and/or where the performance of the operations at least partially overlap in time) with the performance of a transport operation for the atomic object crystal. For example, the de-excitation operation may be performed on the atomic object crystal while the atomic object crystal is being transported so as to further reduce the time required to perform the transportation and cooling of the atomic object crystal.

Moreover, various embodiments provide multi-mode shim waveforms that are configured to cause de-excitation of multiple motional modes simultaneously. For example, a multi-mode shim waveform may be configured such that the resulting electric potential gradient and the time evolution thereof is configured to de-excite COM mode, stretch mode, and/or other modes of motion simultaneously. In various embodiments, the atomic objects and/or crystal(s) of atomic objects are de-excited via the application of the shim waveforms to the respective electrodes of the confinement apparatus during and/or after performance of a transportation operation such as a linear transport (e.g., being transported along a linear confinement region or leg of the confinement apparatus), a split operation (e.g., when two or more atomic objects or atomic object crystals are separated from one another such that initially the two or more atomic objects or atomic object crystals were disposed within one electric potential well and at the end of the split operation the atomic objects or atomic object crystals are disposed in separate electric potential wells), and/or the like. Various other technical advantages and improvements are provided by various embodiments, as will become apparent to one of ordinary skill in the art based on the following description of various embodiments.

Exemplary Quantum Computer System

De-excitation of motional modes of atomic objects and/or atomic object crystals confined by an atomic object confinement apparatus may be performed in a wide variety of contexts and/or for a wide variety of applications. One example context is quantum charge-coupled device (QCCD)-based quantum computing. FIG. 1 provides a block diagram of an example quantum computer system 100. In various embodiments, the quantum computer system 100 comprises a computing entity 10 and a quantum computer 110.

In various embodiments, the quantum computer 110 comprises a controller 30, a cryogenic and/or vacuum chamber 40 enclosing an atomic object confinement apparatus 50 having atomic objects confined thereby, and one or more manipulation sources 64 (e.g., 64A, 64B, 64C). In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more atomic objects within the apparatus 50. For example, a first manipulation source 64A is configured to generate and/or provide a first manipulation signal and a second manipulation source 64B is configured to generate and/or provide a second manipulation signal, wherein the first and second manipulation signals are configured to collectively laser cool atomic objects confined by the atomic object confinement apparatus, perform quantum logic gate on one or more atomic objects, perform a reading operation on one or more atomic objects, and/or the like.

In various embodiments, the atomic object confinement apparatus 50 is an ion trap, such as a surface ion trap, Paul ion trap, and/or the like. In various embodiments, the atomic objects are ion, atoms, neutral and/or ionic molecules, and/or the like.

In various embodiments, the atomic objects confined by the atomic object confinement apparatus are organized into atomic object crystals. For example, an atomic object crystal comprises two or more atomic objects. In an example embodiment, the first component of the atomic object crystal is a coolant ion for use in a sympathetic cooling scheme for the atomic object crystal. In an example embodiment, the second component of the atomic object crystal is a qubit ion for use as a qubit of a quantum computer. In various embodiments, the first component of the atomic object crystal and the second component of the atomic object crystal may be of the same atomic type or different atomic types, as appropriate for the application. As used herein, the atomic type of an atomic object and/or component of an atomic object crystal refers to the type of chemical element, atomic number, atomic/ionic species, and/or the like of the atomic object and/or component of the atomic object crystal. For example, an atomic object crystal comprises two atomic objects that have different charge-to-mass ratios, in an example embodiment.

In an example embodiment, the one or more manipulation sources 64 each provide a manipulation signal (e.g., laser beam and/or the like) to one or more regions of the atomic object confinement apparatus 50 via corresponding beam paths 66 (e.g., 66A, 66B, 66C). In various embodiments, at least one beam path 66 comprises a modulator configured to modulate the manipulation signal being provided to the apparatus 50 via the beam path 66. In various embodiments, the manipulation sources 64, modulator, and/or other components of the quantum computer 110 are controlled by the controller 30.

In various embodiments, the quantum computer 110 comprises one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 are permanent magnets, Helmholtz coils, electrical magnets, and/or the like. In various embodiments, the magnetic field generators 70 are configured to generate a magnetic field at one or more regions of the atomic object confinement apparatus 50 that has a particular magnitude and a particular magnetic field direction in the one or more regions of the atomic object confinement apparatus 50.

In various embodiments, the quantum computer 110 comprises voltages sources 80 configured to provide electrical signals to electrodes of the electrode array of the atomic object confinement apparatus and/or to radio frequency (RF) rails and/or electrodes of the atomic object confinement apparatus. For example, the voltages sources 80 may comprise arbitrary wave generators (AWGs), digital/analog converters (DACs), and/or the like configured to generate and provide various electrical signals. The voltage sources 80 are electrically coupled to the corresponding potential generating elements (e.g., electrodes of the electrode array, RF rails) of the atomic object confinement apparatus 50, in an example embodiment. For example, the voltage sources 80 are configured to provide periodic voltage signals to the RF rails and waveform voltage signals in accordance with one or more transport waveforms and/or shim waveforms to the electrodes of the electrode array of the atomic object confinement apparatus. In various embodiments, the voltages sources 80 are controlled by respective driver controller elements of the controller 30.

In various embodiments, the quantum computer 110 comprises an optics collection system 90 configured to collect and/or detect photons generated and/or scattered by atomic objects confined by the atomic object confinement apparatus 50. The optics collection system 90 may comprise one or more optical elements (e.g., lenses, mirrors, waveguides, fiber optics cables, and/or the like) and one or more photodetectors. In various embodiments, the photodetectors may be photodiodes, photomultipliers, charge-coupled device (CCD) sensors, complementary metal oxide semiconductor (CMOS) sensors, Micro-Electro-Mechanical Systems (MEMS) sensors, and/or other photodetectors that are sensitive to light and/or the frequency of light of the quantum computer 110. In various embodiments, the detectors may be in electronic communication with the quantum system controller 30 via one or more A/D converters 725 (see FIG. 7) and/or the like.

In various embodiments, the controller 30 is configured to control voltage sources 80, electrical signal sources, and/or drivers controlling the atomic object confinement apparatus 50 and/or transport of atomic objects within the atomic object confinement apparatus 50, a cryogenic system and/or vacuum system controlling the temperature and pressure within the cryogenic and/or vacuum chamber 40, manipulation sources 64, magnetic field generators 70, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, quantum circuits, and/or the like into a computing language, executable instructions, command sets, and/or the like that the controller 30 can understand and/or implement.

Exemplary Atomic Object Confinement Apparatus

FIG. 2 illustrates a first atomic object crystal 220A and a second atomic object crystal 220B confined in a portion 200 of an atomic object confinement apparatus 50. In the illustrated embodiment, each of the first atomic object crystal 220A and the second atomic object crystal 220B comprise a respective first component 222 which is of a first atomic type and a second component 224 which is of a second atomic type. In various embodiments, the first atomic type and the second atomic type are different. For example, the first component 222 of an atomic object crystal 220 may have a different charge-to-mass ratio than the second component 224 of the atomic object crystal 224. In an example embodiment, the first component 222 is a first type of ion and the second component 224 is a second, different type of ion.

In various embodiments, the atomic object confinement apparatus 50 may be an atomic object confinement apparatus as described by U.S. Patent Application No. 63/235,007, filed Aug. 19, 2021, U.S. patent application Ser. No. 17/533,587, filed Nov. 23, 2021, and/or U.S. Pat. No. 11,037,776, issued Jun. 15, 2021, the contents of which are hereby incorporated herein by reference in their entireties.

FIG. 2 provides a top schematic view of a portion 200 of an example atomic object confinement apparatus 50. The example atomic object confinement apparatus 50 may be a one-dimensional atomic object confinement apparatus, a two-dimensional atomic object confinement apparatus, an atomic object confinement apparatus that comprises a two-dimensional (possibly periodic) array of one-dimensional trapping segments, and/or the like. In an example embodiment, the atomic object confinement apparatus 200 is a multi-dimensional (e.g., two or three-dimensional) surface ion trap, surface Paul trap, and/or the like configured to trap a plurality of atomic objects (e.g., ions, atoms, neutral and/or ionic molecules, and/or the like) and/or atomic object crystals therein.

In an example embodiment, the atomic object confinement apparatus 50 is fabricated as part of an atomic object confinement apparatus chip and/or part of an atomic object confinement apparatus package. For example, the atomic object confinement apparatus 50 may be formed on a chip that comprises a plurality of leads and/or wiring attachment points such that a plurality of voltage signals (e.g., periodic voltage signals, waveform voltages signals) may be provided and/or applied to the RF rails 210 and the electrodes 204 of the array of electrodes, respectively.

In an example embodiment, the atomic object confinement apparatus 50 is at least partially defined by a number of radio frequency (RF) rails 210 (e.g., 210A, 210B). In various embodiments, the atomic object confinement apparatus 50 is at least partially defined by a number of sequences of electrodes 202 (e.g., 202A, 202B, 202C). For example, the sequences of electrodes 202 form an array of electrodes 204. In various embodiments, a variety of electrode 204 geometries, placements, layouts, and/or the like may be used. The illustrated electrode 204 geometry, placement, layout, and/or the like is provided for illustrative purposes and, in various embodiments, will be determined and/or configured based on the intended application of the atomic object confinement apparatus 50. In various embodiments, the upper surface of the atomic object confinement apparatus 50 has a planarized topology. For example, the upper surface of each RF rail 210 of the number of RF rails and the upper surface of each electrode 204 of the number of sequences of electrodes 202 may be substantially coplanar. In an example embodiment, the surface of the atomic object confinement apparatus 50 is not planar and a plane is defined from which the height of the atomic objects above the "surface" of the atomic object confinement apparatus 50 is measured.

In various embodiments, two adjacent and/or substantially parallel RF rails 210 may be separated (e.g., insulated) from one another by a longitudinal gap 215. For example, the longitudinal gap 215 may define (in one or two dimensions) the confinement channel or region of the atomic object confinement apparatus 50 in which one or more atomic objects and/or atomic object crystals 220 may be confined and/or trapped at various locations within the atomic object confinement apparatus 50. In various embodiments, the longitudinal gap 215 defined thereby may extend substantially parallel to the adjacent RF rails 210 along the length of a corresponding portion and/or leg. In an example embodiment, the longitudinal gap 215 may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap has a width (e.g., distance between adjacent RF rails 210) of approximately 40 μm to 500 μm. In various embodiments, one or more sequences of electrodes 202B is disposed and/or formed within the longitudinal gap 215.

In various embodiments, the atomic object confinement apparatus 50 (and/or legs and/or junctions thereof) may be at least partially defined by a number of sequences of electrodes 202 each comprising a plurality of electrodes 204. In an example embodiment, each sequence of electrodes 202 that is associated with and/or at least partially defines a leg is formed to extend substantially parallel to the one or more the RF rails 210 that at least partially define the respective leg along at least a portion of the length of the leg. For example, the three sequences of electrodes 202A, 202B, 202C at least partially define the portion 200 of the atomic object confinement apparatus 50 illustrated in FIG. 2. Each of the three sequences of electrodes 202 comprise a plurality of electrodes 204. In various embodiments, the number of sequences of electrodes 202 that at least partially define each leg comprises two, three, four, and/or another number of sequences of electrodes. In an example embodiment, the atomic object confinement apparatus 50 comprises a plurality of number of sequences of electrodes 202, with each number of sequences of electrodes at least partially defining a leg and/or a junction of the atomic object confinement apparatus 50. In some embodiments, each of the electrodes 204 are formed with substantially coplanar upper surfaces that are substantially coplanar with the upper surfaces of the RF rails 210.

In an example embodiment, a transverse gap may exist between neighboring and/or adjacent electrodes 204. In an example embodiment, the transverse gap may be empty space and/or at least partially filled with a dielectric material to prevent electrical communication between neighboring and/or adjacent electrodes 204. In an example embodiment, the transverse gap between neighboring and/or adjacent electrodes 204 may be in the range of approximately 1-10 μm.

In an example embodiment, a longitudinal gap exists between a sequence of electrodes 202 and a neighboring and/or adjacent RF rail 210. In an example embodiment, the longitudinal gap may be at least partially filled with a dielectric and/or insulating material to prevent electrical communication between electrodes 204 of the sequence of electrodes 202 and the RF rail 210. In an example embodiment, the longitudinal gap between electrodes 204 and a neighboring and/or adjacent RF rail 210 may be in the range of approximately 1-10 μm.

In an example embodiment a number (e.g., pair) of RF rails 210 may be formed between a first sequence of electrodes 202A and a third sequence of electrodes 202C with a second sequence of TT electrodes 202B extending along the longitudinal channel between the RF rails 210. For example, each sequence of electrodes 202 of a particular leg may extend in a direction substantially parallel to the corresponding RF rails 210 along at least a portion of the length of the particular leg. In various embodiments, the upper surfaces of the electrodes 204 are substantially coplanar with the upper surfaces of the RF rails 210.

In various embodiments, periodic voltage signals (e.g., voltage signals having a radio frequency periodicity) may be applied to the RF rails 210 to generate an electric and/or magnetic field that acts to maintain an atomic object confined and/or trapped within the atomic object confinement apparatus 50. For example, the RF rails 210 that at least in part define a particular leg generate an electric pseudopotential that confines and/or traps atomic objects within the particular leg in directions transverse to the corresponding one-dimensional segment and/or portion of the atomic object confinement apparatus 50. For example, the RF rails 210 are configured to, when a periodic voltage signal is applied thereto, generate a pseudopotential that confines and/or traps atomic objects along a one-dimensional segment illustrated by a dashed line 212 in FIG. 2 that represents the local pseudopotential null. For example, the radio frequency null along a leg defines a transport path (e.g., transport path 232) along the leg along which atomic objects and/or atomic object crystals 220 can be transported along at least a portion of the length of the leg.

In various embodiments, the electrodes 204 of the array of electrodes (e.g., formed by the number of sequences of electrodes 202) are configured to have waveform voltage signals applied thereto such that the electrodes 204 generate a time-dependent electric potential field that causes the atomic objects and/or atomic object crystals to be transported along the transport path (e.g., along the RF null) for the corresponding portion of the atomic object confinement apparatus 50. For example, the electrical and/or magnetic field generated at least in part by waveform voltage signals applied to the electrodes 204 may trap at least one atomic object and/or atomic object crystal in a potential well above the upper surface of the second sequence of electrodes 202B and/or the longitudinal gap 215 of the respective leg and/or portion of the atomic object confinement apparatus 50. Additionally, the waveform voltage signals applied to the electrodes 204 may cause atomic objects confined and/or trapped within the potential well above the upper surface of the second sequence of electrodes 204 and/or the longitudinal gap 215 to traverse trajectories and/or transport paths that substantially follow and/or are along the RF null for the corresponding and/or portion of the atomic object confinement apparatus.

In various embodiments, the waveform voltage signals applied to the electrodes 204 and the periodic voltage signals applied to the RF rails 210 are controlled by one or more connected devices (e.g., a controller 30 as shown in FIG. 7 and/or the like) via leads. For example, a controller 30 may control a voltage source 80 and/or other voltage driver to cause the voltage source 80 and/or driver to apply waveform voltage signals to the electrodes 204 to generate a time-dependent electric potential (e.g., an electric potential that evolves with time) that causes the atomic objects trapped and/or confined by the atomic object confinement apparatus 50 to be transported along prescribed transport paths and/or held at prescribed positions and/or to experience a de-excitation operation.

Depending on such factors as the charge on the at least one atomic object and/or atomic objects of an atomic object crystal and/or the shape and/or magnitude of the combined electrical and/or magnetic fields (e.g., generated via application of the periodic voltage signals to the RF rails 210 and the waveform voltage signals to the electrodes 204), the atomic objects can be stabilized at a particular distance (e.g., approximately 20 μm to approximately 200 μm) above an upper surface of the atomic object confinement apparatus 50 (e.g., the coplanar upper surface of the electrodes 204 and RF rails 210). To further contribute to controlling the transit of atomic objects and/or atomic object crystals along desired trajectories, the atomic object confinement apparatus 50 may be operated within a cryogenic and/or vacuum chamber 40 capable of cooling the atomic object confinement apparatus 50 to a temperature of less than 124 Kelvin (e.g., less than 100 Kelvin, less than 50 Kelvin, less than 10 Kelvin, less than 5 Kelvin, and/or the like), in various embodiments.

Example De-Excitation Operation

In various embodiments, the controller 30 controls one or more components of the quantum computer to perform de-excitation operations configured to reduce the motional energy of one or more atomic object crystals 220 confined by the atomic object confinement apparatus 50. In various embodiments, the de-excitation operations may be performed at least partially in parallel with and/or in a coordinated manner with one or more transport operations. In various embodiments, performance of a de-excitation operation comprises application of a respective series of voltages to electrodes 204 of the electrode array formed by the number of sequences of electrodes 202 to cause at least partial de-excitation of at least one motional mode an atomic object crystal 220. In various embodiments, performance of a transport operation comprises application of a respective series of voltages to electrodes 204 of the electrode array formed by the number of sequences of electrodes 202 to cause an atomic object and/or atomic object crystal to be transported from a respective start location 230 within the atomic object confinement apparatus 50 to a respective destination location 234 within the atomic object confinement apparatus 50 along a transport path 232. As used herein, the term at least partially in parallel means at least semi/quasi-simultaneously and/or where the performance of the operations at least partially overlap in time. For example, operations performed at last partially in parallel may be performed simultaneously, in an example embodiment.

In various embodiments, the respective series of voltages are determined algebraically, using simulations, and/or experimentally based on the array of electrodes of the atomic object confinement apparatus 50 and the voltages that need to be applied thereto to generate the desired (time-dependent) electric potential well. In various embodiments, the controller 30 stores (e.g., in memory 710) a library of transport waveforms and/or shim waveforms that may be used to perform various transport operations and/or de-excitation operations, respectively.

In various embodiments, the controller 30 may control voltage sources 80 and/or drivers to cause series of voltages to be applied to electrodes 204 the array of electrodes formed by the number of sequences of electrodes 202 of the atomic object confinement apparatus that cause one or more atomic objects 222, 224 and/or atomic object crystals 220 to experience one or more transport operations and/or de-excitation operations. In various embodiments, the controller 30 is configured to cause one or more transport operations and/or de-excitation operations to be performed at least partially in parallel. For example, the controller 30 may determine one or more transport waveforms and/or shim waveforms to be applied. Each waveform comprises a series of voltages to be applied to each electrode 204 and/or a subset of electrodes of the electrode array formed by the number of sequences of electrodes 202.

In various embodiments, the series of voltages of a transport waveform are configured to cause a transport operation to be performed on an atomic object and/or atomic object crystal. For example, application of the series of voltages of a transport waveform to the array of electrodes (in a time-ordered sequence specified by the series of voltages) causes an electric potential well to be formed at a start location 230 within the atomic object confinement apparatus at a first time. The atomic object crystal 220A to be transported is located at the start location 230 at the first time. Application of the series of voltages of the transport waveform to the array of electrodes causes the electric potential well to move from the start location 230 to a destination location 234, such that the electric potential well, and the atomic object and/or atomic object crystal therein, traverse the transport path 232 from the start location 230 to the destination location 234. The electric potential well and the atomic object(s) 222, 224 and/or atomic object crystal 220 are located at the destination location 234 at a second time.

Similarly, a shim waveforms comprise a series of voltages. When the voltages of the series of voltages are applied to the electrode array in time-ordered sequence specified by the series of voltages, an electric potential gradient that evolves with time is formed at the location of the atomic object crystal to be de-excited. The electric potential gradient is configured to impart a force on the atomic object crystal (and/or the components thereof) that counteracts the oscillatory motion(s) of the atomic object crystal (and/or components thereof). In an example embodiment, the electric potential gradient is configured to move along the transport path 232 with the electric potential well and the atomic object(s) 222, 224 and/or atomic object crystal 220 to the destination location 234. In an example embodiment, the shim waveform may continue to cause the electric potential gradient to be provided at the destination location 234 for a period of time after the atomic object(s) 222, 224 and/or atomic object crystal 220 arrive at the destination location 220 (e.g., until a third time). In an example embodiment, various laser cooling techniques may be used while the atomic object(s) 222, 224 and/or atomic object crystal 220 are located at the destination location 234 at least partially overlapping with the period of time that the electric potential gradient is being provided at the destination location 234 (e.g., for at least part of the time between the second time and the third time).

FIG. 3 provides a schematic illustration of how the electric potential gradient generated at the location of an atomic object crystal 220 affects the coherent motion of atomic object crystal 220 over one period of motion of a COM mode oscillation. The dashed line 305 illustrates the substantially constant location of the COM of the atomic object crystal 220 over time. The solid arrows illustrate the respective accelerations $a_1$ of the first component 222 of the atomic object crystal and the accelerations $a_2$ of the second component 224 of the atomic object crystal 220 at various points in time. The dotted arrows illustrate the respective forces $F_1$ experienced by the first component 222 of the atomic object crystal 220 as a result of the electric potential gradient and the forces $F_2$ experienced by the second component 224 of the atomic object crystal 220 as a result of the electric potential gradient. The electric potential gradient evolves with time in accordance with the motional frequency of the motional modes so that, as can be seen in FIG. 3, the direction and magnitude of the forces $F_1$, $F_2$ (which are functions of time) experienced by the components of the atomic object crystal 220 as a result of the electric potential gradient are configured to counter the direction and magnitude of the accelerations $a_1$, $a_2$ of the components of the atomic object crystal 220 as a result of the atomic object crystal oscillating in the motional mode. As a result, the forces $F_1$, $F_2$ experienced by the components of the atomic object crystal 220 as a result of the electric potential gradient cause the motional mode oscillations to be dampened (e.g., reduced in amplitude). This results in the atomic object crystal having a lower motional energy (e.g., less kinetic energy). In an example embodiment, the forces $F_1$, $F_2$ experienced by the components of the atomic object crystal 220 as a result of the electric potential gradient cause the motional mode oscillations to be eliminated such that the atomic object crystal 220 is in its motional ground state. In another example embodiment, the atomic object crystal 220 reaches its motional ground state through a combination of a de-excitation operation and a laser cooling operation.

In various embodiments, various operations may be performed at least partially in parallel. For example, FIG. 2 illustrates a first atomic object crystal 202A.1 and a second atomic object crystal 202B.1 each located at a respective start location 230 at a first time. FIG. 2 further illustrates that by a second time (which is after the first time), the first atomic object crystal 220A.2 and the second atomic object crystal 220B.2 are each located at a respective destination location 234 after having traversed respective transport paths 232 between the first time and the second time. For example, the controller 30 may cause transport operations to be performed one the first atomic object crystal 220A and the second atomic object crystal 220B at least partially in parallel.

Additionally, the controller 30 may cause a de-excitation operation to be performed on the first atomic object between the first time and a third time (which is equal to or later than the second time) and/or a de-excitation operation to be performed on the second atomic object between the first time and the third time. For example, the de-excitation operations may be configured to de-excite motional modes of the respective atomic object crystal that were excited during performance of the respective transport operation. In various scenarios, the motional mode excitation experienced by the first atomic object 220A may be different from that experienced by the second atomic object 220B (e.g., due to differences in the respective transport operations (e.g., whether a transport path traverses one or more junctions of the atomic object confinement apparatus or not, the length of the transport path, differences in the axial frequencies of the respective potential wells within which the respective atomic objects are confined/trapped/transported, and/or the like), differences between the atomic object crystals, and/or the like). Thus, the transport waveforms and the shim waveforms used to perform the transport operations and de-excitation operations are localized so as to affect the electric potential at the instant location of the target atomic object crystal 220 and to not affect the electric potential at one or more other locations within the atomic object confinement apparatus 50.

Example Calibration of Shim Waveforms for De-Excitation Operations

In various embodiments a shim waveform is determined based at least in part on one or more parameterized particular-mode shim waveforms. In various embodiments, the respective parameters for each of the one or more parameterized particular-mode shim waveforms are determined through a calibration process. In various embodiments, the respective parameters for one or more parametrized particular-mode shim waveforms are determined in an automated manner. In various embodiments, the parameters are particular to the atomic object confinement apparatus 50 and the electrode array thereof. In various embodiments, the parameters of the parameterized particular-mode shim waveform comprise and/or consist of a respective motional frequency for the corresponding particular motional mode, a respective motional amplitude for the corresponding particular motional mode, and a phase for the corresponding particular motional mode. In various embodiments, the respective motional frequency, motional amplitude, and/or phase is a function of the axial frequency of a potential well that trapping and/or confining the target atomic object crystal. In various embodiments, the axial frequency of a potential well that is trapping and/or confining the target atomic object crystal is a parameter of the parameterized particular-mode shim waveform.

FIG. 4 provides a flowchart illustrating various processes, procedures, operations, and/or the like for performing a calibration process 400 for determining the parameters for a particular-mode shim waveform for a particular atomic object confinement apparatus 50. In various embodiments, the controller 30 of the quantum computer 110 controls one or more components of the quantum computer 110 to perform the processes, procedures, operations, and/or the like of the calibration process 400. For example, a processing device 705 (see FIG. 7) of the controller 30 may execute computer-readable instructions (e.g., stored in memory 710) to cause the processing device 705, memory 710, driver controller elements 715, A/D converters 725, and/or the like of the controller 30 to cause performance of various processes, procedures, operations, and/or the like of the calibration process 400.

Starting at step/operation 402 of FIG. 4, the controller 30 causes performance of a transport operation. For example, the controller 30 causes a transport operation to be performed on an atomic object crystal 220. For example, the controller 30 may cause a series of voltages to be applied to electrodes 204 of the electrode array of the atomic object confinement apparatus 50 to cause a potential well characterized by and/or defining an axial frequency to move from a respective start location to a respective destination location along a transport path such that a respective atomic object crystal is transported from the respective to the respective destination location along the transport path.

At step/operation 404, the controller 30 captures one or more first crystal spectra. For example, the controller 30 causes a manipulation source to generate and/or provide a manipulation signal that is incident on the atomic object crystal. In various embodiments, the manipulation signal defines and/or is characterized by a probe frequency. For example, the manipulation signal may be a laser beam of the probe frequency. In an example embodiment, the manipulation signal is incident on the atomic object crystal for a fixed exposure time. In various embodiments, the probe frequency corresponds to a Raman transition of at least one component (e.g., one of the atomic objects) of the atomic object crystal. The atomic object crystal (and/or a component thereof) may scatter at least a portion of the manipulation signal and/or absorb at least a portion of the manipulation signal and emit light as a result of the absorption of the manipulation signal. This scattered and/or emitted light forms the first crystal spectra. The optics collection system 90 captures the first crystal spectra and provides the first crystal spectra to the controller 30.

In an example embodiment, step/operation 404 is performed after performance of step/operation 402. In an example embodiment, step/operation 404 is performed one or more times during the performance of step/operation 402.

At step/operation 406, the controller 30 (and/or the computing entity 10) identifies and/or determines one or more sidebands in the first crystal spectra. For example, the first crystal spectra comprises a line at the probe frequency. Due to the Doppler effect, the first crystal spectra also comprises one or more sidebands at respective frequencies that are each separated from the probe frequency by a respective motional frequency of a respective motional mode of the atomic object crystal that was excited by the transport operation. For example, the first crystal spectra will include sidebands corresponding to the motional modes of the atomic object crystal that were excited by the transport operation. These sidebands, the respective motional frequencies, and the respective sideband intensities can be determined and/or identified via various spectra analyzing and/or processing techniques.

At step/operation 408, the controller 30 (and/or computing entity 10) determines and/or extracts motional amplitude and motional frequency information from the first crystal spectra for one or more motional modes of the atomic object crystal that was excited by the transport operation. In various embodiments, the motional frequencies of various motional modes of the atomic object crystal are known such that identifying the motional frequencies present in the first crystal spectra enables the determination of which motional modes of the atomic object crystal were excited by the transport operation. In various embodiments, the intensity of a respective sideband is used to determine the motional amplitude of a respective motional mode. For example, the greater the intensity of a respective sideband, the greater the motional energy present in the respective motional mode. Thus, the motional frequency and motional amplitude information determined based on the first crystal spectra enables the determination of which motional modes of the atomic object crystal that were excited by the transport operation and how much motional energy is present in each of the motional modes of the atomic object crystal that was excited by the transport operation.

At step/operation 410, the controller 30 (and/or computing entity 10) determines a phase-parameterized shim waveform that corresponds to a particular motional mode for which a sideband was detected in the first crystal spectra. For example, the phase-parametrized shim waveform comprises a series of voltages that can be shifted in time based on a phase parameter. For example, the phase-parameterized shim waveform is a function of a motional amplitude of the respective motional mode and an oscillatory function of time. For example, the amplitude of the resulting electric potential gradient may be modulated in time in accordance with $\sin(\omega t+\varphi)$, for example, where $\omega$ is the motional frequency of the respective motional mode, t is a variable representing time, and $\varphi$ is the phase parameter. Thus, the phase-parametrized shim waveform is a series of voltages configured to (when applied to the electrodes 204 of the electrode array of the atomic object confinement apparatus) generate an electric potential gradient at the location of the atomic object crystal that is modulated in time in accordance with $\sin(\omega t+\varphi)$.

At step/operation 412, the controller 30 causes the phase-parameterized shim waveform to be applied while incrementing over a phase range and capturing second crystal spectra. For example, the controller 30 may cause the phase-parameterized shim waveform to be applied with a phase $\varphi_0$ for a first length of time and then capture a second crystal spectra corresponding to the phase $\varphi_0$. The controller 30 may then cause the phase-parameterized shim waveform to be applied with a phase $\varphi_1$ for a first length of time and then capture a second crystal spectra corresponding to the phase $\varphi_1$. Similarly, the controller 30 may cause the phase-parameterized shim waveform to be applied with a phase $\varphi_i$ for a first period of time and then capture a second crystal spectra corresponding to the phase $\varphi_i$ for each $\varphi_i$ in a phase set $\{\varphi_i\}$. In an example embodiment, the phase set $\{\varphi_i\}=\{2\pi i/n|0\leq i\leq n\}$ for n a natural number.

In various embodiments, to capture each second crystal spectra, the controller 30 causes a manipulation source to generate and/or provide a manipulation signal that is incident on the atomic object crystal. In various embodiments, the manipulation signal defines and/or is characterized by the same probe frequency used to capture the first crystal frequency. In an example embodiment, the manipulation signal is incident on the atomic object crystal for a fixed exposure time. Light scattered and/or emitted light by the atomic object crystal as a result of the manipulation signal being incident on the atomic object crystal is captured by the optics collection system 90 and provided to the controller 30 as a respective second crystal spectra (e.g., corresponding to particular phase $\varphi_i$). As should be understood, a plurality of second crystal spectra are captured with each second crystal spectra corresponding to respective phase $\varphi_i$, in an example embodiment.

In various embodiments, step/operation 402 is still being performed while step/operation 412 is performed. In various embodiments, step/operation 402 is being performed again and/or is being iteratively performed during the performance of step/operation 412. In an example embodiment, step/operation 412 comprises iteratively performing a transport operation, applying a phase-parameterized shim waveform for a respective phase $\varphi_i$, and capturing a respective second crystal spectra corresponding to the respective phase $\varphi_i$.

At step/operation 414, one or more phases for which the respective corresponding second crystal spectra includes the most significant reduction in and/or smallest intensity for a respective sideband, compared to the first crystal spectra and/or other second crystal spectra, are determined and/or identified. For example, the controller 30 (and/or computing entity 10) analyzes and/or processes the plurality of second crystal spectra to determine which of the second crystal spectra includes the smallest intensity for a respective sideband corresponding to a respective motional mode. In an example embodiment, each of the second crystal spectra are compared to the first crystal spectra to determine which of the second crystal spectra provides the largest reduction in intensity of the respective sideband corresponding to the respective motional mode.

The phase $\varphi_i$ corresponding to the second crystal spectra determined to and/or identified as providing the most significant reduction in and/or smallest intensity for the respective sideband corresponding to the respective motional mode and the phase-parameterized shim waveform are used to generate and/or determine a particular-mode shim waveform for the respective motional mode. For example, the particular-mode shim waveform for the respective motional mode may be generated, determined, and/or defined as the result of setting the phase parameter of the phase-parameterized shim waveform to $\varphi_i$.

At step/operation 416, the particular-mode shim waveform is provided and/or stored. For example, the controller 30 may store the particular-mode shim waveform to memory 710 (e.g., as part of a waveform library, and/or the like). In various embodiments, the particular-mode shim waveform is stored in association with metadata. For example, the metadata indicates the respective motional mode; a timestamp indicating when the particular-mode shim waveform was generated, determined, and/or stored; one or more parameters of the particular-mode shim waveform (e.g., motional frequency, motional amplitude, phase, axial frequency); an axial frequency associated with the particular-mode shim waveform; and/or the like.

As noted, the particular-mode shim waveform is configured for de-exciting a respective motional mode. However, multiple motional modes of an atomic object crystal may be excited by a transport operation. In various embodiments, the calibration process 400 and/or various steps/operations thereof are performed multiple times so as to generate and/or determine a plurality of particular-mode shim waveforms. For example, particular-mode shim waveforms may be generated and/or determined for multiple motional modes. For example, a shim waveform library stored in the memory 710 may be populated with particular-mode shim waveforms corresponding to one or more motional modes of the atomic object crystal. In various embodiments, the motional modes for which particular-mode shim waveforms are determined may be determined and/or identified based on which motional modes and/or corresponding sidebands are identified in the first crystal spectra.

In various embodiments, the calibration process 400 may include performing transport operations on a plurality of atomic object crystals, capturing a plurality of respective first crystal spectra of the plurality of atomic object crystals, determining an aggregated first crystal spectra based on the plurality of respective first crystal spectra, determining sidebands present in the aggregated first crystal spectra, extracting motional frequency and/or motional amplitude information for one or more sidebands present in the aggregated first crystal spectra, and determining one or more particular-mode shim waveforms for respective sidebands and/or corresponding motional modes present in the aggregated first crystal spectra based on application of phase-parameterize shim waveforms for a plurality of atomic object crystals and aggregated second crystal spectra determined based thereon.

In various embodiments, the calibration process 400 may be performed multiple times for transport operations corresponding to different axial frequencies such that the axial frequency dependency of particular-mode shim waveforms may be determined and/or such that a plurality of particular-mode shim waveforms may be determined with each particular-mode shim waveform corresponding to a respective axial frequency. The determined particular-mode shim waveforms are particular to the atomic object confinement apparatus 50, in various embodiments.

Example Performance of a De-Excitation Operation

In various embodiments, de-excitation operations may be performed during the performance of quantum calculations, execution of quantum programs/circuits, and/or the like. For example, a de-excitation operation may be performed at least partially in parallel with and/or in a coordinated manner with a transport operation during the performance of quantum calculations, execution of quantum programs/circuits, and/or the like. In various embodiments, the atomic object confinement apparatus 50 confines a plurality of atomic object crystals and multiple transport operations and/or de-excitation operations are performed at least partially in parallel (e.g., at different locations (e.g., different respective start and/or destination locations) within the atomic object confinement apparatus 50). In various embodiments, multi-mode de-excitation operations are performed.

FIG. 5 provides a flowchart illustrating various processes, procedures, operations, and/or the like that may be performed by the controller 30 to perform one or more de-excitation operations at least partially in parallel. In various embodiments, the one or more de-excitation operations are performed at least partially in parallel and/or in coordination with respective transport operations. In various embodiments, the controller 30 of the quantum computer 110 controls one or more components of the quantum computer 110 to perform the processes, procedures, operations, and/or the like shown in FIG. 5. For example, a processing device 705 of the controller 30 may execute computer-readable instructions (e.g., stored in memory 710) to cause the processing device 705, memory 710, driver controller elements 715, A/D converters 725, and/or the like of the controller 30 to cause performance of various processes, procedures, operations, and/or the like shown in FIG. 5.

Starting at step/operation 502, one or more transport operations to be performed are identified. For example, the controller 30 identifies one or more transportation operations to be performed at least partially in parallel. In various embodiments, each of the one or more transportation operations corresponds to moving a respective atomic object crystal from a respective start location to a respective destination location along a respective transport path within the atomic object confinement apparatus 50. In various embodiments, each transport operation is associated with a respective axial frequency. In various embodiments, the respective axial frequencies are the same or different from one another.

At step/operation 504, the controller 30 determines, identifies, and/or accesses (e.g., from a waveform library stored in memory 710) respective transport waveforms for the one or more transport operations. In various embodiments, the respective transport waveforms are determined, identified, and/or accessed based on respective axial frequency for each transport operation. In an example embodiment, for example, respective transport waveforms for each of the one or more transport operations are determined, identified, and/or accessed based on the respective start location of the transport operation, the respective destination location of the transport operation, the respective transport path of the transport operation, the respective axial frequency of the transport operation, and/or the like. For example, a transport waveform may comprise one more localization parameters that control the location of the resulting electric potential well. The localization parameters may be set based on the start location, destination location, and/or transport path of the corresponding transport operation. For example, the transport waveform is configured such that the resulting electric potential well is localized at a time dependent location corresponding to the transport path that causes the atomic object crystal to traverse the transport path, in an example embodiment.

At step/operation 506, the controller 30 determines, identifies, and/or accesses (e.g., from a waveform library stored in memory 710) respective particular-mode shim waveforms for one or more motional modes for at least one of the one or more transport operations. In an example embodiment, the controller 30 determines, identifies, and/or accesses respective particular-mode shim waveforms for one or more motional modes for each respective transport operation of the one or more transport operations. For example, respective particular-mode shim waveforms for respective first order motional modes expected to be excited for respective ones of the one or more transport operations may be determined, identified, and/or accessed, in an example embodiment. In an example embodiment, respective particular-mode shim waveforms for two or more motional modes expected to be excited for respective ones of the one or more transport operations are determined, identified, and/or accessed. For example, particular-mode shim forms corresponding to COM and/or stretch modes of the respective atomic object crystal may be determined, identified, and/or accessed.

In an example embodiment, a result of the calibration process is the storing of multi-mode waveforms generated and/or determined by adding together and/or aggregating particular-mode shim waveforms for two or more different motional modes. In such an embodiment, respective multi-mode shim waveforms may be determined, identified, and/or accessed for respective ones of the one or more transport operations. For example, a multi-mode shim waveform is an aggregation of at least (a) a first particular-mode shim waveform corresponding to a first coherent motional mode of the respective atomic object crystal and (b) a second particular-mode shim waveform corresponding to a second coherent motional mode of the respective atomic object crystal. The first coherent motional mode is characterized by a first motional frequency and the second coherent motional mode is characterized by a second motional frequency. The first motional frequency and the second motional frequency are different. For example the first motional frequency and the second motional frequency may differ by at least a factor of 1.5, in an example embodiment. For example, in an example embodiment, the motional frequency of the COM mode of an atomic object crystal is approximately 1 MHz and the motional frequency of the stretch mode of the atomic object crystal is approximately 1.8 MHz. As should be understood, the motional frequencies of the motional modes of an atomic object crystal will depend on the components of the atomic object crystal and the environment that the atomic object crystal is experiencing (e.g., the axial frequency of the electric potential well that the atomic object crystal is confined in, etc.).

In an example embodiment, a particular-mode shim waveform (or multi-mode shim waveform) corresponds to a transport operation is determined, identified, and/or accessed based on the start location of the transport operation, the destination location of the transport operation, the transport path of the transport operation, the axial frequency of the transport operation, and/or the like. For example, the particular-mode shim waveform (or multi-mode shim waveform) may comprise one more localization parameters that control the location of the resulting electric potential gradient. The localization parameters may be set based on the start location, destination location, and/or transport path of the corresponding transport operation. For example, when a de-excitation operation is to be performed at least partially in parallel with a transport operation, the shim waveform is configured such that the resulting electric potential gradient is localized at the instantaneous location of the atomic object crystal as the atomic object crystal is traversing the transport path, in an example embodiment. In various embodiments, a parameter of a shim waveform is set based on the axial frequency of the transport operation (e.g., the motional amplitude, motional frequency, and/or phase of the shim waveform maybe a function of the axial frequency) and/or a shim waveform corresponding to a particular axial frequency may be selected for performance of a transport operation with the particular axial frequency.

At step/operation 508, the controller 30 determines an applied waveform based on the respective particular-mode shim waveforms and the respective transport waveforms. For example, the respective particular mode shim waveforms determined, identified, and/or accessed at step/operation 506 and the transport waveforms determined, identified and/or accessed at step/operation 504 are aggregated and/or added together to determine and/or generate an applied waveform. The applied waveform is a series of voltages that includes a respective voltage to be applied to a subset and/or all of the electrodes 204 of the electrode array of the atomic object confinement apparatus 50 for each time step of the series (e.g., between the first time and the second time and/or third time). The series of voltages of the applied waveform are configured, when applied to the electrodes 204 of the array of electrodes of the atomic object confinement apparatus 50, to generate respective electric potential wells each configured to cause a respective atomic object crystal to be transported along a respective transport path in accordance with a respective transport operation and to generate respective electric potential gradients each configured to cause a de-excitation of one or more motional modes of a respective atomic object crystal. Each of the respective electric potential wells and respective electric potential gradients are localized at a location corresponding to the respective atomic object. For example, a first electric potential gradient configured to de-excite at least one motional mode of a first atomic object is configured to de-excite the at least one motional mode of the first atomic object but to not affect (e.g., not excite or de-excite) any motional modes of a second atomic object. In various embodiments, the applied waveform is determined by adding together, for each time step of the series and for a first electrode 204, the voltage for the corresponding time step and for the first electrode from each of the transport waveforms and each of the particular-mode shim waveforms (or multi-mode shim waveforms).

At step/operation 510, the controller 30 controls the voltages sources 80 to cause the voltage sources 80 to generate and provide waveform voltage signals in accordance with the series of voltages of the applied waveform such that the waveform voltage signals are applied to the electrodes 204 of the array of electrodes formed by the number of sequences of electrodes 202 of the atomic object confinement apparatus 50. In various embodiments, application of the waveform voltage signals generated in accordance with the series of voltages of the applied waveform to the electrodes 204 from the first time to the second and/or third time causes the one or more transport operations to be performed and the de-excitation operation corresponding to one or more motional modes for at least one of the one or more transport operations to be performed.

In various embodiments, a cooling operation that includes laser cooling may also be performed (e.g., between the second time and the third time, for example) to further cool the respective atomic object crystals and/or to remove heat and/or motional/kinetic energy absorbed by respective atomic object crystals during the respective transport operations.

As should be understood, the processes, procedures, and/or operations shown in FIG. 5 may be repeated multiple times during the performance of a quantum calculation and/or execution of a quantum program/circuit.

Example Performance of at Least Partially Parallel De-Excitation Operations with Reduced Parasitic Cross-Talk Therebetween As described above, in various embodiments, the atomic object confinement apparatus 50 is formed on a chip and/or the like comprising leads and/or electrical connections. The leads and/or electrical connections enable voltage signals (periodic voltage signals, waveform voltage signals, and/or other voltage signals) generated by the voltage sources 80 to be applied to the electrodes (e.g., RF rails 210, electrodes 204) of the atomic object confinement apparatus 50. In various scenarios, when de-excitation operations are to be performed at multiple locations within the atomic object confinements apparatus 50 in an at least partially parallel manner, parasitic couplings in the wiring and/or leads between different electrodes 204 may allow the waveform voltage signals applied to an electrode to show up on another electrode, thus partially defeating the localization of the de-excitation forces. For example, parasitic cross-talk between the wiring and/or leads configured to provide respective waveform voltage signals to different electrodes affects the ability to localize the resulting electric potential gradient at the desired location (e.g., at the location of the respective atomic object crystal). This can lead to excitation of motional modes of atomic object crystals other than the target atomic object crystal of the de-excitation operation. Thus, a technical problem exists as to how to perform de-excitation operations at different locations within the atomic object confinement apparatus in an at least partially parallel manner while not unintentionally exciting motional modes of other atomic object crystals.

Various embodiments provide technical solutions to these technical problems. For example, the axial frequencies of transport operations corresponding to the respective de-excitation operations may be selected, assigned, and/or the like such that the axial frequencies are spaced apart such that the waveform voltage signals are less likely to become coupled.

FIG. 6 provides a flowchart illustrating various processes, procedures, operations, and/or the like that may be performed by the controller 30 to perform two or more de-excitation operations at least partially in parallel with reduced parasitic cross-talk. In various embodiments, the two or more de-excitation operations are performed at least partially in parallel and/or in coordination with respective transport operations. In various embodiments, the controller 30 of the quantum computer 110 controls one or more components of the quantum computer 110 to perform the processes, procedures, operations, and/or the like shown in FIG. 6. For example, a processing device 705 of the controller 30 may execute computer-readable instructions (e.g., stored in memory 710) to cause the processing device 705, memory 710, driver controller elements 715, A/D converters 725, and/or the like of the controller 30 to cause performance of various processes, procedures, operations, and/or the like shown in FIG. 6.

Starting at step/operation 602, two or more transport operations to be performed are identified. For example, the controller 30 identifies two or more transportation operations to be performed at least partially in parallel. In various embodiments, each of the two or more transportation operations corresponds to moving a respective atomic object crystal from a respective start location to a respective destination location along a respective transport path within the atomic object confinement apparatus 50.

At step/operation 604, a respective axial frequency is determined and/or assigned for each of the two or more transportation operations. For example, the controller 30 determines and/or assigns a respective axial frequency to each of the two or more transportation operations. In various embodiments, the respective axial frequencies are spaced apart from one another. For example, the respective axial frequencies comprise a first axial frequency and a second axial frequency that are separated from one another by a frequency difference in the range of 0.05 to 10 MHz. In an example embodiment, for a first axial frequency of the respective axial frequencies, none of the other respective axial frequencies is within a minimum frequency difference of the first axial frequency. In an example embodiment, the minimum frequency difference is in the range of 0.05 to 10 MHz. In an example embodiment, the minimum frequency difference is approximately 100 kHz. In an example embodiment, the frequency difference is within the range of 50 kHz and 1 MHz.

At step/operation 606, the controller 30 determines, identifies, and/or accesses (e.g., from a waveform library stored in memory 710) respective transport waveforms for the one or more transport operations. In various embodiments, the respective transport waveforms are determined, identified, and/or accessed based on the determined and/or assigned respective axial frequency for each transport operation. In an example embodiment, for example, respective transport waveforms for each of the one or more transport operations are determined, identified, and/or accessed based on the respective start location of the transport operation, the respective destination location of the transport operation, the respective transport path of the transport operation, the determined and/or assigned respective axial frequency of the transport operation, and/or the like. For example, a transport waveform may comprise one more localization parameters that control the location of the resulting electric potential well. The localization parameters may be set based on the start location, destination location, and/or transport path of the corresponding transport operation. For example, the transport waveform is configured such that the resulting electric potential well is localized at a time dependent location corresponding to the transport path that causes the atomic object crystal to traverse the transport path, in an example embodiment.

At step/operation 608, the controller 30 determines, identifies, and/or accesses (e.g., from a waveform library stored in memory 710) respective particular-mode shim waveforms for one or more motional modes for at least one of the one or more transport operations. In an example embodiment, the controller 30 determines, identifies, and/or accesses respective particular-mode shim waveforms for one or more motional modes for each respective transport operation of the one or more transport operations. For example, respective particular-mode shim waveforms for respective first order motional modes expected to be excited for respective ones of the one or more transport operations may be determined, identified, and/or accessed, in an example embodiment. In an example embodiment, respective particular-mode shim waveforms for two or more motional modes expected to be excited for respective ones of the one or more transport operations are determined, identified, and/or accessed. For example, particular-mode shim forms corresponding to COM and/or stretch modes of the respective atomic object crystal may be determined, identified, and/or accessed.

In an example embodiment, a result of the calibration process is the storing of multi-mode waveforms generated and/or determined by adding together and/or aggregating particular-mode shim waveforms for two or more different motional modes. In such an embodiment, respective multi-mode shim waveforms may be determined, identified, and/or accessed for respective ones of the one or more transport operations. For example, a multi-mode shim waveform is an aggregation of at least (a) a first particular-mode shim waveform corresponding to a first coherent motional mode of the respective atomic object crystal and (b) a second particular-mode shim waveform corresponding to a second coherent motional mode of the respective atomic object crystal. The first coherent motional mode is characterized by a first motional frequency and the second coherent motional mode is characterized by a second motional frequency. The first motional frequency and the second motional frequency are different. For example the first motional frequency and the second motional frequency may differ by at least a factor of 1.5, in an example embodiment.

In an example embodiment, a particular-mode shim waveform (or multi-mode shim waveform) corresponds to a transport operation is determined, identified, and/or accessed based on the start location of the transport operation, the destination location of the transport operation, the transport path of the transport operation, the determined and/or assigned axial frequency of the transport operation, and/or the like. For example, the particular-mode shim waveform (or multi-mode shim waveform) may comprise one more localization parameters that control the location of the resulting electric potential gradient. The localization parameters may be set based on the start location, destination location, and/or transport path of the corresponding transport operation. For example, when a de-excitation operation is to be performed at least partially in parallel with a transport operation, the shim waveform is configured such that the resulting electric potential gradient is localized at the instantaneous location of the atomic object crystal as the atomic object crystal is traversing the transport path, in an example embodiment. In various embodiments, a parameter of a shim waveform is set based on the determined and/or assigned axial frequency of the transport operation (e.g., the motional amplitude, motional frequency, and/or phase of the shim waveform maybe a function of the axial frequency) and/or a shim waveform corresponding to a particular determined and/or assigned axial frequency may be selected for performance of a transport operation with the particular determined and/or assigned axial frequency.

At step/operation 610, the controller 30 determines an applied waveform based on the respective particular-mode shim waveforms and the respective transport waveforms. For example, the respective particular mode shim waveforms determined, identified, and/or accessed at step/operation 608 and the transport waveforms determined, identified and/or accessed at step/operation 606 are aggregated and/or added together to determine and/or generate an applied waveform. The applied waveform is a series of voltages that includes a respective voltage to be applied to a subset and/or all of the electrodes 204 of the electrode array of the atomic object confinement apparatus 50 for each time step of the series (e.g., between the first time and the second time and/or third time). The series of voltages of the applied waveform are configured, when applied to the electrodes 204 of the array of electrodes of the atomic object confinement apparatus 50, to generate respective electric potential wells each configured to cause a respective atomic object crystal to be transported along a respective transport path in accordance with a respective transport operation and to generate respective electric potential gradients each configured to cause a de-excitation of one or more motional modes of a respective atomic object crystal.

Each of the respective electric potential wells and respective electric potential gradients are localized at a location corresponding to the respective atomic object. For example, a first electric potential gradient configured to de-excite at least one motional mode of a first atomic object is configured to de-excite the at least one motional mode of the first atomic object but to not affect (e.g., not excite or de-excite) any motional modes of a second atomic object. In various embodiments, the applied waveform is determined by adding together, for each time step of the series and for a first electrode 204, the voltage for the corresponding time step and for the first electrode from each of the transport waveforms and each of the particular-mode shim waveforms (or multi-mode shim waveforms).

At step/operation 612, the controller 30 controls the voltages sources 80 to cause the voltage sources 80 to generate and provide waveform voltage signals in accordance with the series of voltages of the applied waveform such that the waveform voltage signals are applied to the electrodes 204 of the array of electrodes formed by the number of sequences of electrodes 202 of the atomic object confinement apparatus 50. In various embodiments, application of the waveform voltage signals generated in accordance with the series of voltages of the applied waveform to the electrodes 204 from the first time to the second and/or third time causes the one or more transport operations to be performed and the de-excitation operation corresponding to one or more motional modes for at least one of the one or more transport operations to be performed.

Moreover, due to the differences in the respective axial frequencies associated with the two or more transport operations, parasitic cross-talk between the wiring and/or leads configured to provide the waveform voltage signals to the electrodes 204 is reduced, thereby preserving the localization of the electric potential wells and/or electric potential gradients. For example, due to the differences in the respective axial frequencies associated with the two or more transport operations, parasitic cross-talk between the wiring and/or leads configured to provide the waveform voltage signals to the electrodes 204 is reduced, causing the effects of the transport operations and de-excitation operations to be isolated to the respective target atomic object crystals.

In various embodiments, cooling operations that includes laser cooling may also be performed (e.g., between the second time and the third time, for example) to further cool the respective atomic object crystals and/or to remove heat and/or motional/kinetic energy absorbed by respective atomic object crystals during the respective transport operations.

As should be understood, the processes, procedures, and/or operations shown in FIG. 6 may be repeated multiple times during the performance of a quantum calculation and/or execution of a quantum program/circuit.

Technical Advantages

In various scenarios, during the performance of experiments, controlled quantum state evolution, quantum computations, and/or the like, the atomic objects and/or atomic object crystals may be transported from a respective start location within the atomic object confinement apparatus to a respective destination location within the atomic object confinement apparatus. During such transportation operations, the atomic objects and/or atomic object crystals become excited such that the atomic objects and/or atomic object crystals are no longer in their motional ground state. Conventionally, laser cooling is used to reduce the motional energy of the atomic object and/or components thereof. However, laser cooling is a slow process compared to various other processes executed during the performance of experiments, controlled quantum state evolution, quantum computations, and/or the like. For example, the time required to perform transportation and cooling operations is conventionally considered a limiting factor in the computational speed of QCCD quantum computers. Moreover, the significant amount of time required to cool atomic object crystals after performance of a transportation operation limits the depth of quantum circuits and/or quantum programs that can be performed by a QCCD quantum computer and can contribute to memory error. Thus, technical problems exist as to how to quickly and efficiently reduce the motional energy of an atomic object crystal and to de-excite the motional states of the atomic object crystal.

Atomic object crystals comprising two atomic objects (e.g., a coolant ion and a qubit ion) may oscillate in center-of-mass (COM) modes, where the two atomic objects oscillate in a manner that the distance between the two atomic objects remains substantially constant such that the center-of-mass of the atomic object crystal oscillates. The atomic object crystals comprising two atomic objects may also oscillate in stretch modes, where the distance between the two atomic objects expands and contracts in a periodic manner. Additionally, the atomic object crystals may oscillate in superpositions of COM modes and/or stretch modes that may have different motional frequencies, motional amplitudes, and/or phases. Additional motional modes and superpositions thereof are also possible, especially in instances where the charge-to-mass ratio of the components of the atomic object crystal are different. Thus, de-excitation of these superpositions of motional modes presents a technical challenge.

Additional technical challenges are presented when the atomic object crystal to be de-excited is one of a plurality of atomic object crystals confined by an atomic object confinement apparatus. In such scenarios it would be desired to de-excite a particular atomic object crystal while not simultaneously exciting any of the other atomic object crystals that are also confined by the atomic object confinement apparatus. It may also be desired to perform two or more de-excitation operations at least partially in parallel (e.g., semi-simultaneously and/or where the performance of the de-excitation operations at least partially overlap in time). Thus, a technical problem exists as to how to localize the effects of the de-excitation operation.

Various embodiments provide technical solutions to these and other technical problems relating to de-excitation of coherent motional modes of atomic object crystals confined by an atomic object confinement apparatus. For example, various embodiments provide mode-particular and/or multi-mode shim waveforms. The shim waveforms comprise a series of voltages. The series of voltages includes voltages to be applied to each electrode and/or a subset of electrodes of an electrode array of the atomic object confinement apparatus at a plurality of time steps. When the voltages of the series of voltages are applied to the electrode array of the atomic object confinement apparatus in time-ordered sequence specified by the series of voltages, an electric potential gradient that evolves with time is formed at the location of the atomic object crystal to be de-excited. The electric potential gradient is configured to impart a force on the atomic object crystal (and/or the components thereof) that counteracts the oscillatory motion(s) of the atomic object crystal (and/or components thereof).

In various embodiments, the mode-particular and/or multi-mode shim waveforms are configured to localize the resulting electric potential gradient at a particular location within the atomic object confinement apparatus. For example, the mode-particular and/or multi-mode shim waveforms may be configured such that the location of the resulting electric potential gradient is localized at the location of a target atomic object crystal while not affecting other nearby atomic object crystals and/or other atomic object crystals within the atomic object confinement apparatus. In various embodiments, the mode-particular and/or multi-mode shim waveforms may be configured such that the location of the resulting electric potential gradient may be non-constant such that a de-excitation operation may be performed on an atomic object crystal at least partially in parallel (e.g., semi-simultaneously and/or where the performance of the operations at least partially overlap in time) with the performance of a transport operation for the atomic object crystal. For example, the de-excitation operation may be performed on the atomic object crystal while the atomic object crystal is being transported so as to further reduce the time required to perform the transportation and cooling of the atomic object crystal.

Moreover, various embodiments provide multi-mode shim waveforms that are configured to cause de-excitation of multiple motional modes simultaneously. For example, a multi-mode shim waveform may be configured such that the resulting electric potential gradient and the time evolution thereof is configured to de-excite COM mode, stretch mode, and/or other modes of motion simultaneously.

Additionally, when multiple de-excitation operations are performed at different locations within the atomic object confinement apparatus in an at least partially parallel manner, parasitic cross-talk between the leads and/or wiring configured to provide respective waveform voltage signals to the electrodes 204 of the atomic object confinement apparatus can degrade the localization of the effects of the de-excitation operations. This may lead to the unintentional excitation of motional modes in atomic object crystals, causing a further technical problem.

Various embodiments are configured to de-couple the parasitic couplings between the leads and/or or wiring configured to provide respective waveform voltage signals to the electrodes 204, such that the cross-talk therebetween is reduced and/or eliminated. For example, the axial frequencies of the corresponding transport operations are determined and/or assigned in a spaced apart manner so as to decrease the parasitic couplings between the leads and/or or wiring configured to provide respective waveform voltage signals to the electrodes 204 caused by the oscillating waveform voltage signals corresponding toe the respective shim waveforms.

Exemplary Controller

In various embodiments, a quantum computer 110 comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measurement operations; leakage suppression/transformation operations; and/or the like). For example, the controller 30 may be configured to perform one or more transport operations, one or more de-excitation operations, and/or the like. For example, the controller 30 may be configured to control a cryogenic system and/or vacuum system controlling the temperature and pressure within the cryogenic and/or vacuum chamber 40, manipulation sources 64, voltage sources configured to apply voltage signals (e.g., periodic voltage signals, waveform voltage signals) to electrodes (e.g., RF rails 210, electrodes 204) of the atomic object confinement apparatus 50, magnetic field generators 70, and/or systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 7, in various embodiments, the controller 30 may comprise various controller elements including processing elements 705, memory 710, driver controller elements 715, a communication interface 720, analog-digital converter elements 725, and/or the like. For example, the processing elements 705 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 705 of the controller 30 comprises a clock and/or is in communication with a clock.

For example, the memory 710 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, DIMM, SIMM, VRAM, cache memory, register memory, and/or the like. In various embodiments, the memory 710 may store qubit records corresponding to the qubits of the quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 710 (e.g., by a processing element 705) causes the controller 30 to perform one or more steps, operations, processes, procedures and/or the like described herein.

In various embodiments, the driver controller elements 715 may include one or more drivers and/or controller elements each configured to control one or more drivers. In various embodiments, the driver controller elements 715 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 705). In various embodiments, the driver controller elements 715 may enable the controller 30 to operate and/or control one or more manipulation sources 64, control one or more magnetic field generators 70, control one or more voltages sources 80 and/or drivers, operate vacuum and/or cryogenic systems, and/or the like. In various embodiments, the drivers may be laser drivers; vacuum component drivers; voltage sources (e.g., AC voltage sources, arbitrary waveform generators (AWG), direct digital synthesizers (DDS), and/or the like); cryogenic and/or vacuum system component drivers; and/or the like. In various embodiments, the controller 30 comprises means for communicating and/or receiving signals from one or more optical receiver components such as cameras, MEMS cameras, CCD cameras, photodiodes, photomultiplier tubes, and/or the like. For example, the controller 30 may comprise one or more analog-digital converter elements 725 configured to receive signals from one or more optical receiver components, calibration sensors, and/or the like. For example, the controller 30 may receive measurements corresponding to conditions in particular regions and/or portions of the atomic object confinement apparatus 50 and/or corresponding to various atomic objects via the analog-digital converter elements 725.

In various embodiments, the controller 30 may comprise a communication interface 720 for interfacing and/or communicating with a computing entity 10. For example, the controller 30 may comprise a communication interface 720 for receiving executable instructions, command sets, and/or the like from the computing entity 10 and providing output received from the quantum computer 110 (e.g., from an optical collection system or other measurement system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 8 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit that may be provided such that the controller 30 may receive the quantum algorithm and/or quantum circuit and cause the quantum computer 110 to perform the quantum algorithm and/or quantum circuit.

As shown in FIG. 8, a computing entity 10 can include an antenna 812, a transmitter 814 (e.g., radio), a receiver 806 (e.g., radio), and a processing device and/or element 808 that provides signals to and receives signals from the transmitter 814 and receiver 806, respectively. The signals provided to and received from the transmitter 814 and the receiver 806, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 816 and/or speaker/speaker driver coupled to a processing device and/or element 808 and a touch screen, keyboard, mouse, and/or microphone coupled to a processing device and/or element 808). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 818 (hard or soft), a touch display, voice/speech or motion interfaces, scanners, readers, or other input device. In embodiments including a keypad 818, the keypad 818 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 822 and/or non-volatile storage or memory 824, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

Conclusion

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for using coherent mode de-excitation during a transport operation of an atomic object crystal confined by an atomic object confinement apparatus, the method comprising:

identifying one or more transport operations to be performed at least partially in parallel, each transport operation of the one or more transport operations corresponding to moving a respective atomic object crystal from a respective start location to a respective destination location, the start location and destination location being locations within the atomic object confinement apparatus;

determining respective shim waveforms for at least one of the one or more transport operations;

determining respective transport waveforms for each transport operation;

determining an applied waveform based on an aggregation of the respective shim waveforms and the respective transport waveforms; and controlling one or more voltage sources to cause waveform voltage signals in accordance with the applied waveform to be applied to electrodes of an array of electrodes of the atomic object confinement apparatus, wherein application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

2. The method of claim 1, wherein the respective shim waveforms are an aggregation of two or more particular-mode shim waveforms, each of the two or more particular-mode shim waveforms corresponding to a different coherent motional mode of the respective atomic object crystal.

3. The method of claim 1, wherein the respective shim waveforms are an aggregation of at least (a) a first particular-mode shim waveform corresponding to a first coherent motional mode of the respective atomic object crystal and (b) a second particular-mode shim waveform corresponding toa second coherent motional mode of the respective atomic object crystal, the first coherent motional mode is characterized by a first motional frequency and the second coherent motional mode is characterized by a second motional frequency, the first motional frequency and the second motional frequency are different.

4. The method of claim 3, wherein the first coherent motional mode is a center-of-mass mode and the second coherent motional mode is a stretch mode.

5. The method of claim 1, wherein the applied waveform comprises a series of voltages to be applied to the array of electrodes of the atomic object confinement apparatus to cause the one or more transport operations to be performed and to cause a gradient in an electric potential at a first location of the atomic object confinement apparatus where the respective atomic object crystal corresponding to the at least one of the one or more transport operations is located in the atomic object confinement apparatus.

6. The method of claim 5, wherein the first location follows the atomic object crystal from the respective start location to the respective destination location of the at least one of the one or more transport operations.

7. The method of claim 5, wherein the at least one of the one or more transport operations comprises at least a first transport operation and a second transport operation, the first transport operation comprises moving a first electric potential well within which a first atomic object crystal is located from a first start location to a first destination location and the second transport operation comprises moving a second potential well within which a second atomic object crystal is located from a second start location to a second destination location, and the applied waveform comprises (a) at least one particular-mode shim waveform configured to cause a first gradient in the electric potential co-located with the first electric potential well as the first electric potential well moves from the first start location to the first destination location and (b) at least one particular-mode shim waveform configured to cause a second gradient in the electric potential co-located with the second potential well as the second potential well moves from the second start location to the second destination location.

8. The method of claim 7, wherein the first gradient is substantially zero at the location of the second atomic object crystal and the second gradient is substantially zero at the location of the first atomic object crystal.

9. The method of claim 7, wherein the first electric potential well defines a first axial frequency, the second potential well defines a second axial frequency, and the first axial frequency and the second axial frequency are spaced apart by 0.05 to 5 MHz.

10. The method of claim 1, wherein the respective particular-mode shim waveforms are each associated with or parameterized by a respective axial frequency corresponding to at least one of (a) the transport operation or (b) an electric potential well at a location of the atomic object confinement apparatus where the respective atomic object crystal is located.

11. The method of claim 1, wherein the respective particular mode shim waveforms are each parameterized by a respective motional mode frequency, a respective motional mode amplitude, and a respective phase.

12. An apparatus comprising at least one processor and memory storing computer-executable instructions, the computer-executable instructions are configured to, when executed by the at least one processor, cause the apparatus to at least:

identify one or more transport operations to be performed at least partially in parallel, wherein each transport operation of the one or more transport operations corresponds to moving a respective atomic object crystal from a respective start location to a respective destination location, the start location and destination location being locations within an atomic object confinement apparatus;

determine respective shim waveforms for at least one of the one or more transport operations;

determine respective transport waveforms for each transport operation;

determine an applied waveform based on an aggregation of the respective shim waveforms and the respective transport waveforms; and control one or more voltage sources to cause waveform voltage signals in accordance with the applied waveform to be applied to electrodes of an array of electrodes of the atomic object confinement apparatus, wherein application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

13. The apparatus of claim 12, wherein the respective shim waveforms are an aggregation of two or more particular-mode shim waveforms, each of the two or more particular-mode shim waveforms corresponding to a different coherent motional mode of the respective atomic object crystal.

14. The apparatus of claim 12, wherein the respective shim waveforms are an aggregation of at least (a) a first particular-mode shim waveform corresponding to a first coherent motional mode of the respective atomic object crystal and (b) a second particular-mode shim waveform corresponding to a second coherent motional mode of the respective atomic object crystal, the first coherent motional mode is characterized by a first motional frequency and the second coherent motional mode is characterized by a second motional frequency, the first motional frequency and the second motional frequency are different.

15. The apparatus of claim 12, wherein the applied waveform comprises a series of voltages to be applied to the array of electrodes of the atomic object confinement apparatus to cause the one or more transport operations to be performed and to cause a gradient in an electric potential at a first location of the atomic object confinement apparatus where the respective atomic object crystal corresponding to the at least one of the one or more transport operations is located in the atomic object confinement apparatus.

16. The apparatus of claim 15, wherein the first location follows the atomic object crystal from the respective start location to the respective destination location of the at least one of the one or more transport operations.

17. The apparatus of claim 15, wherein the at least one of the one or more transport operations comprises at least a first transport operation and a second transport operation, the first transport operation comprises moving a first electric potential well within which a first atomic object crystal is located from a first start location to a first destination location and the second transport operation comprises moving a second potential well within which a second atomic object crystal is located from a second start location to a second destination location, and the applied waveform comprises (a) at least one particular-mode shim waveform configured to cause a first gradient in the electric potential co-located with the first electric potential well as the first electric potential well moves from the first start location to the first destination location and (b) at least one particular-mode shim waveform configured to cause a second gradient in the electric potential co-located with the second potential well as the second potential well moves from the second start location to the second destination location.

18. The apparatus of claim 12, wherein the respective particular-mode shim waveforms are each associated with or parameterized by a respective axial frequency corresponding to at least one of (a) the transport operation or (b) an electric potential well at a location of the atomic object confinement apparatus where the respective atomic object crystal is located.

19. The apparatus of claim 12, wherein the respective particular mode shim waveforms are each parameterized by a respective motional mode frequency, a respective motional mode amplitude, and a respective phase.

20. A system comprising:

an atomic object confinement apparatus configured to confine one or more atomic object crystals therein;

one or more voltage sources; and a controller, the controller comprises at least one processor and memory storing computer-executable instructions, the computer-executable instructions are configured to, when executed by the at least one processor, cause the controller to at least:

identify one or more transport operations to be performed at least partially in parallel, wherein each transport operation of the one or more transport operations corresponds to moving a respective atomic object crystal from a respective start location to a respective destination location, the start location and destination location being locations within the atomic object confinement apparatus;

determine respective shim waveforms for at least one of the one or more transport operations;

determine respective transport waveforms for each transport operation;

determine an applied waveform based on an aggregation of the respective shim waveforms and the respective transport waveforms; and control operation of the one or more voltage sources to cause waveform voltage signals in accordance with the applied waveform to be applied to electrodes of an array of electrodes of the atomic object confinement apparatus, wherein application of the applied waveform to the array of electrodes causes each of the one or more transport operations to be performed on the respective atomic object crystal and causes de-excitation of at least one coherent motional mode of the respective atomic object crystal corresponding to the at least one of the one or more transport operations.

* * * * *